(12) United States Patent
Saez et al.

(10) Patent No.: US 7,487,940 B2
(45) Date of Patent: Feb. 10, 2009

(54) LAPTOP HOLDER

(75) Inventors: Manuel Saez, Brooklyn, NY (US); Lachezar Tsvetanov, Bridgeport, CT (US); Maximo Diaz Heer, Jackson Heights, NY (US)

(73) Assignee: Humanscale Corporation, New York, NY (US)

( * ) Notice: Subject to any disclaimer, the term of this patent is extended or adjusted under 35 U.S.C. 154(b) by 493 days.

(21) Appl. No.: 10/867,514

(22) Filed: Jun. 14, 2004

(65) Prior Publication Data

US 2005/0274852 A1 Dec. 15, 2005

Related U.S. Application Data

(60) Provisional application No. 60/478,445, filed on Jun. 13, 2003.

(51) Int. Cl.
*F16M 11/00* (2006.01)

(52) U.S. Cl. .............. 248/176.1; 248/455; 248/917

(58) Field of Classification Search ......... 248/917–920, 248/121, 176.1, 451, 455, 450, 447, 454, 248/444, 456, 457
See application file for complete search history.

(56) References Cited

U.S. PATENT DOCUMENTS

| | | | | |
|---|---|---|---|---|
| 4,863,124 A * | 9/1989 | Ball et al. ................ 108/28 |
| 5,751,548 A * | 5/1998 | Hall et al. ................ 361/686 |
| 5,769,369 A * | 6/1998 | Meinel .................... 248/176.1 |
| 6,021,720 A * | 2/2000 | Boos et al. ............... 108/44 |
| 6,113,050 A * | 9/2000 | Rush ...................... 248/346.01 |
| 6,123,309 A * | 9/2000 | Sage ....................... 248/316.1 |
| 6,208,508 B1 | 3/2001 | Ruch et al. |
| 6,213,438 B1* | 4/2001 | Ostby et al. ............. 248/276.1 |
| 6,256,193 B1 | 7/2001 | Janik et al. |
| 6,493,220 B1* | 12/2002 | Clark et al. .............. 361/686 |
| 6,504,707 B2* | 1/2003 | Agata et al. ............. 361/681 |
| 6,510,049 B2* | 1/2003 | Rosen ..................... 361/681 |
| 6,588,609 B1* | 7/2003 | Richet et al. ............ 211/163 |
| 6,796,536 B1* | 9/2004 | Sevier, IV .............. 248/121 |
| 6,921,057 B2* | 7/2005 | Chen et al. .............. 248/349.1 |
| 7,172,167 B2* | 2/2007 | Phifer et al. ............ 248/460 |
| 2003/0042380 A1* | 3/2003 | Hagglund et al. ....... 248/286.1 |
| 2004/0011932 A1* | 1/2004 | Duff ....................... 248/157 |
| 2005/0045794 A1* | 3/2005 | Richter ................... 248/371 |
| 2005/0207112 A1* | 9/2005 | Bakker et al. .......... 361/686 |

FOREIGN PATENT DOCUMENTS

GB 2260167 A 4/1993
NL 1 015 704 1/2002

* cited by examiner

*Primary Examiner*—Amy J. Sterling
(74) *Attorney, Agent, or Firm*—Jones, Walker, Waechter, Poitevent, Carrere & Denegre, LLP

(57) ABSTRACT

Disclosed is a stand for a laptop computer or other data display device, wherein the display portion, or monitor, projects upwardly from the data display container. The user can adjust the position of the portable data display container so as to position the top edge of the monitor at the same height as the user's eyes. This position permits the user to maintain better posture when using the data display device. Additionally, the stand of the present invention may provide a rack for restraining cables attached to the data display device. The stand may also have a swivel so that the monitor can be viewed from whatever angle is convenient for the user. Desirably, the stand also includes a document holder and provides an anchor for a security cable.

18 Claims, 27 Drawing Sheets

LAPTOP HOLDER

CROSS-REFERENCE TO RELATED APPLICATION

This application claims the benefit of U.S. Provisional Application No. 60/478,445, filed Jun. 13, 2003.

FIELD OF THE INVENTION

The present invention relates to laptop computers and other portable devices that may include both a display and a data input function. More particularly, the invention relates to a stand for such devices.

BACKGROUND OF THE INVENTION

The torrent of technological innovation over the last 15 years has done little to change the way most people usually interact with their personal computers, which is generally by sitting in front of a keyboard, mouse and monitor.

The problem with the traditional method for a human interacting with their personal computer is that the human body is not suited to sitting for hours at a time, particularly while typing, pointing, clicking, and staring at an illuminated screen. This combination is further frustrated in that it can lead to muscle strain, fatigue and stress. Still, experts in ergonomics say there are several easy and effective ways in which computer users can improve their physical comfort, fight fatigue, and reduce the risk of injuries from repetitive motions.

Laptop computers are popular alternatives to desktop computers. However, the more that laptop computers are made to do the job of desktop computers, the more that their virtues, such as a small form factor and integrated keyboard and display, become liabilities. For example, the user must stare down at the display of the laptop computer while using the keyboard. This becomes fatiguing after more than just casual use.

Posture is one area in which minor adjustments can quickly yield benefits. Even at home, but especially in a more stressful environment like an office, users may force their bodies into rigid positions that result in fatigue, muscle strain, and, potentially, injury.

Maintaining what experts call optimal ergonomic positioning can increase energy levels and improve overall comfort, although it may take a few weeks before the results are noticeable. Good posture keeps the spine in what health professionals call the neutral position. Achieving a neutral position while seated upright in a chair with good lumbar support entails lifting the rib cage away from the hips, tucking in the belly, pulling the shoulders back, centering the weight of the head atop the spine and maintaining the lower back in a gentle C-shaped curve. Sustaining this position can help reduce muscle strain and relieve pressure on the lower back.

Beyond spinal posture, optimal ergonomic positioning requires tailoring the work area to fit the user's needs. Among things necessary to accomplish that is to position the monitor's top edge at eye level. This monitor position reduces muscle strain caused by the weight of your head leaning too far forward or backward.

Laptop users in particular should pay attention to screen height. Often the laptop screen is too low in relation to the user's eyes or the screen itself is very small, prompting the user to hunch forward to see text and images more clearly. A couple of hours in that position can significantly strain the muscles at the back of the neck and throughout the upper body.

U.S. Pat. No. 6,208,508, to Ruch et al., discloses a docking station that supports a notebook computer docked thereto. The '508 patent discloses a type of docking station that provides electrical conductivity through the docking station itself. The docking station is a wedge-like arrangement. Such an arrangement both takes up significant space on a user's desktop, and yet, for most users and most data display devices, does not elevate the laptop display sufficiently so that the top of the display is at the user's eye-level. Moreover, such a device does not adjust to the needs of specific users.

Sanyo, as shown in FIG. 1 (http://www.try-computing.com/docking.htm), sells a generic docking station that is believed to exemplify the prior art docking stations. A docking station may provide power and external connections (to such external facilities as printers and networks) to a laptop.

The Quicklook laptop computer stand, see FIG. 2, tilts the laptop to change the laptop keyboard's typing angle. Such a stand, however, is designed with the assumption that the individual using the laptop computer wants to use the laptop's built-in keyboard. Thus, this stand is primarily intended as a mechanism for improving the ergonomics of the laptop's keyboard. Such a stand does not provide an optimal viewing angle for the laptop display because, for most users and most data display devices, the top edge of the screen is placed at an elevation lower than the user's eye level.

Another example of a laptop stand is the Podium CoolPad, shown in FIG. 3 (http://www.roadtools.com/podium.html). While this stand is adjustable, it only accommodates three alternative heights, which heights are too short to position the top edge of most data display devices at the same elevation as the user's eyes. In part, the limited height adjustment in such devices may be because such devices were developed to tilt the typing angle of the laptop's built-in keyboard and not to raise the height of a data display device.

Yet another solution has been to place the laptop on a stand that holds it high and at an angle, and attaching an external keyboard and mouse. For instance, the laptop stands sold by iCurve (www.griffintechnology.com), as illustrated in FIG. 4, take this approach. However, this device does not adjust to accommodate different sized users and data display devices.

The only device on the market that can raise a data display device of various sizes to the eye level of a variety of users is the device sold by Humanscale (www.humanscale.com) and is shown in FIG. 5. However, the aesthetics of the Humanscale device could be improved upon, and it would be useful to add additional features.

Thus, it would be advantageous to provide a stand for a laptop computer that both supports the laptop computer in a minimal amount of desktop space, while at the same time elevates the laptop computer to a user's eye-level, thereby mitigating the affects of fatigue that are otherwise caused by staring down at the screen of a laptop. It is further desired that such a stand is adjustable to accommodate a range of users.

SUMMARY OF THE INVENTION

The invention provides a laptop computer stand that elevates the laptop display such that the display is at a user's eye-level, while at the same time minimizing the amount of desktop space occupied by the laptop computer. The invention provides a stand that holds the laptop computer in an unfolded position such that the laptop's display is elevated to eye-level and facing forward. The keyboard and track-pad remain exposed but are most likely not used, an external keyboard and mouse being used instead. This provides the user with the choice of any input device, such as an ergonomic keyboard. Further, this allows the user to position the keyboard away from the display, thereby providing a less fatiguing display-keyboard configuration.

The invention is based upon the recognition that many people use laptop computers on a desktop when in the office, as well as for their intended purpose, i.e. on a laptop. Most people who use laptop computers assume an uncomfortable, crouched position when using the laptop on a desktop. Accordingly, a principal benefit of the claimed invention is to elevate the screen of the laptop to a more comfortable level, i.e. eye-level, while at the same time separating the display from the keyboard, thereby allowing the user to position both in a most comfortable configuration.

In another embodiment of the invention, a data display device is positioned for use. For instance, using the present invention, a multi-media device can be positioned such that the display is much better configured to serve as a monitor for displaying video or other multi-media content. Data display devices that could be supported include, in addition to laptop computers, DVD players and e-book readers.

In a particularly preferred embodiment of the present invention that is further ergonomically beneficial, the monitor can be swiveled among several positions.

In yet further embodiments of the present invention, cable management, document support, and an anchor for a laptop computer security cable are provided.

In particular, the presently preferred embodiment of the invention provides a modular laptop stand that is inexpensive to produce and variously adjustable.

In another aspect of the present invention, there is provided a method for enhancing cooling of a laptop comprising elevating a laptop with the laptop stand of the present invention. Such aspect is particularly advantageous in that has the added benefit of extending the laptop's useful life.

DETAILED DESCRIPTION OF THE INVENTION

The present invention provides a stand that is particularly suited for elevating a portable data display device. Preferably, the portable data display device is laptop or notebook computer, portable DVD player, or e-book reader. In particular, the present invention is directed to a laptop computer support stand that elevates the laptop display such that the display is at a user's eye-level. The stand of the present invention is further useful for minimizing the amount of desktop space occupied by the laptop computer, and also provides the user with the ability to arrange the orientation of the display and the keyboard (or other data entry device) in a most comfortable configuration.

The invention comprises a stand that holds the laptop computer in an unfolded position such that the display panel is facing forward and is elevated. Preferably, the display panel is elevated to eye-level or other ergonomically desirable position. The keyboard and track-pad remain exposed; however, it is generally envisioned that they remain unused, an external keyboard and mouse being used instead. The invention takes advantage of the recognition that many people use laptop computers on a desktop when in the office, as well as for their intended purpose, i.e. on the lap top. Most laptop computer users assume an uncomfortable crouched position when using the laptop on a desktop. Accordingly, a principal benefit of the claimed invention is to elevate the screen of the laptop to a more comfortable level (i.e. eye-level).

A further benefit of the invention is that the positioning of the computer, particularly in an elevated position, facilitates cooling of the laptop by enhancing air circulation about the laptop's case. Additionally, the cooling can be further encouraged through the choice of material for use in making the stand. For example, the stand can be made of a heat conductive material that conducts heat away from the laptop computer.

In another embodiment of the invention, the stand can be used with a multi-media device such that the monitor of the multi-media device is better positioned for viewing, preferably encouraging an ergonomically preferred posture. In a particular embodiment, the multi-media device is a portable DVD player.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
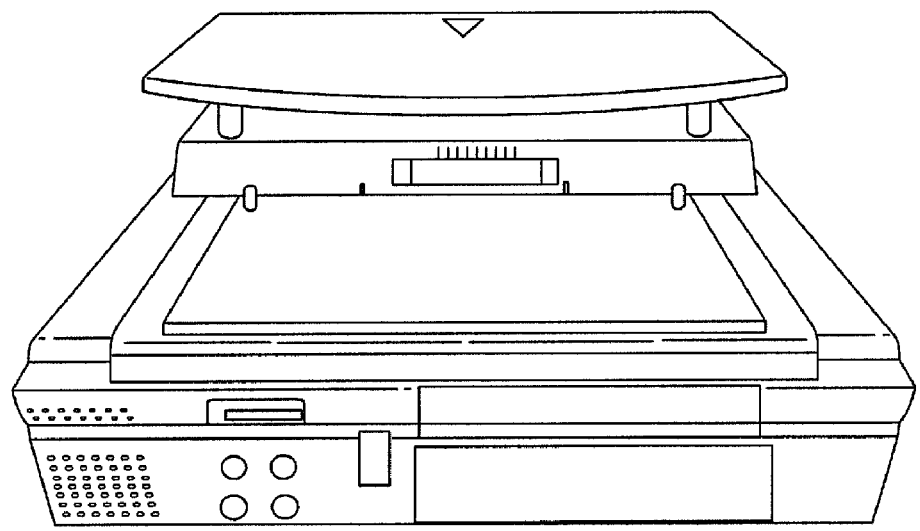
FIG. 1 is a perspective view of a prior art laptop computer docking station.
Figure 2:
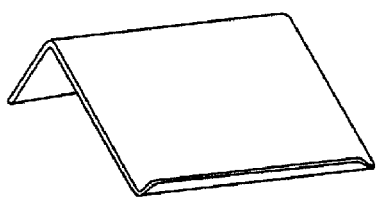
FIG. 2 is a perspective view of a prior art laptop stand.
Figure 3:
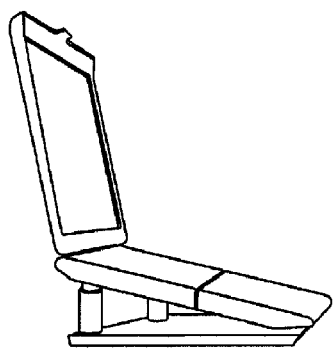
FIG. 3 is a perspective view of a second prior art laptop stand.
Figure 4:
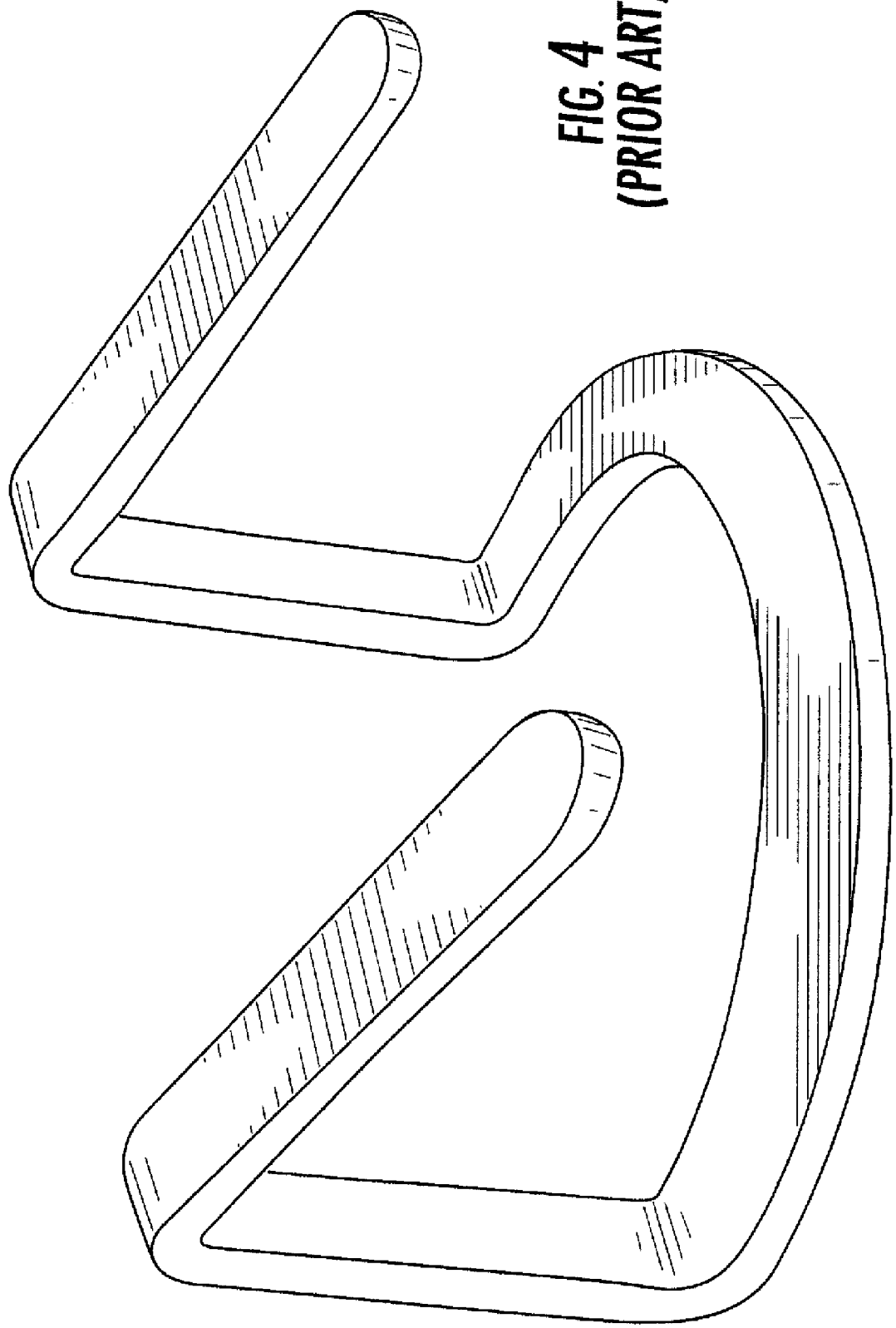
FIG. 4 is a perspective view of a third prior art laptop stand.
Figure 5:
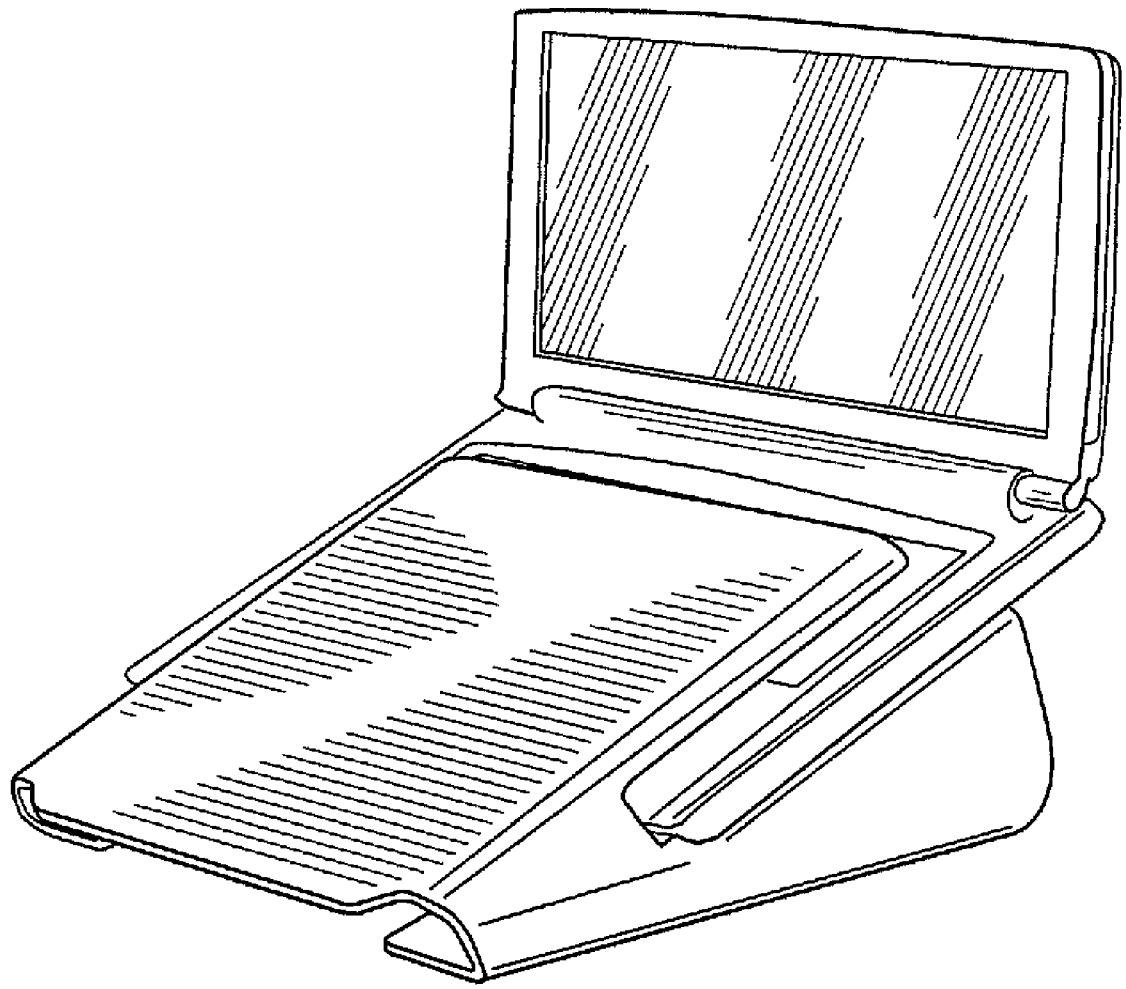
FIG. 5 is a perspective view of a fourth prior art laptop stand.
Figure 6:
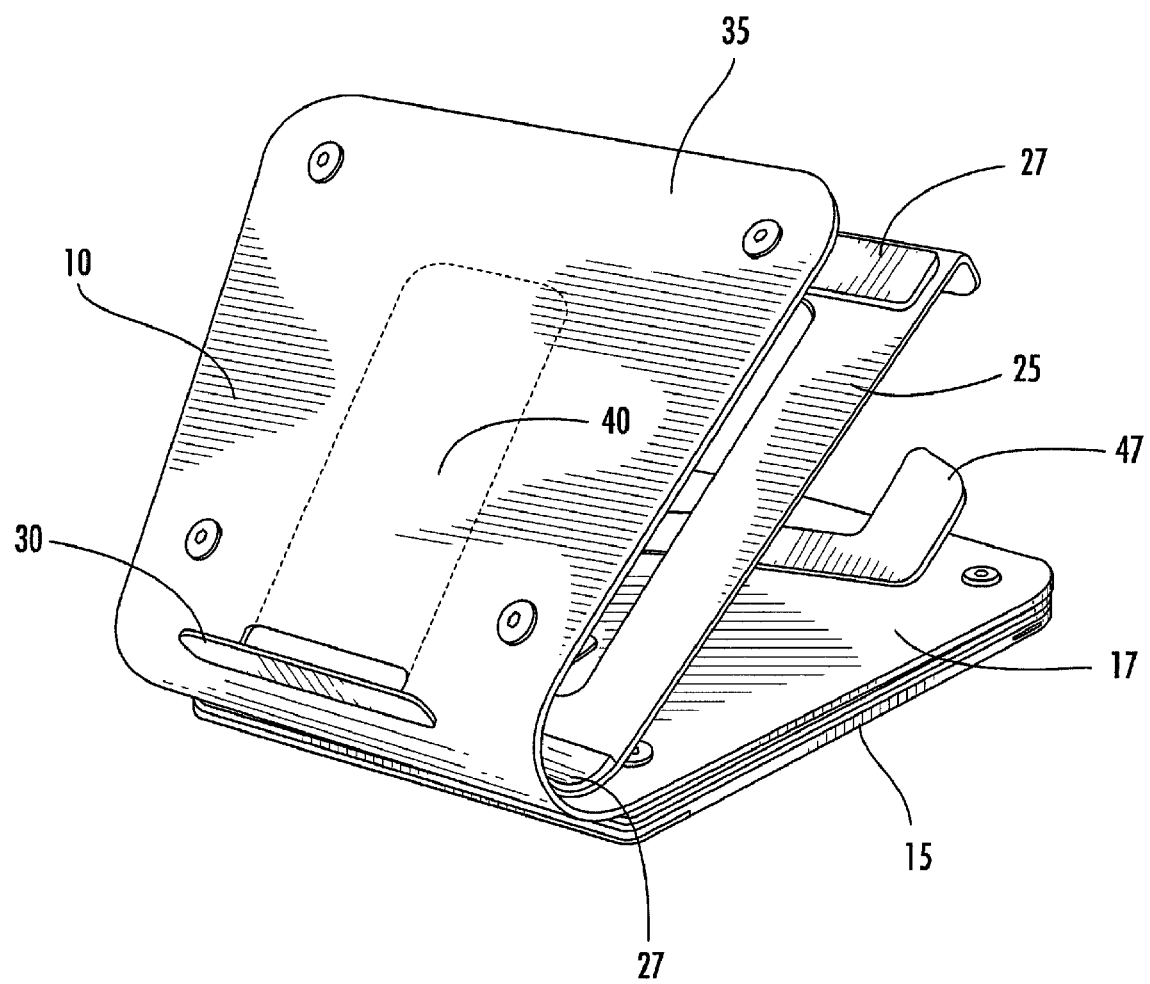
FIG. 6 is a front perspective view of a preferred embodiment of the present invention.

A particularly preferred embodiment of the present invention is provided in FIG. 6, which shows a perspective view of the portable data display stand. In FIG. 6, there is shown a stand 10 comprising a base portion 17 being rotatably mounted on a turntable 15. Base portion 17 further comprises an upwardly projecting arm 35 that provides support for a data display base container 25. Upwardly projecting arm 35 connected to container 25 may be moved upward or downward to provide more or less elevation to the portable data display (e.g. a laptop computer). Upwardly projecting arm 35 connected to data display base container 25 is maintained in a given position with support 45 (not visible). According to the present embodiment, support 45 is a slide brake, which provides the user with continuous adjustment throughout the range of the apparatus as opposed to incremental height adjustment as provided in the prior art. The elevation of support 10 can be adjusted with handle 47, which temporarily disengages the brake to allow for adjustment.

According to a particularly preferred embodiment, support 45 is slide brake that employs a torsion spring as a locking means. The slide brake is further comprised of an outer tube, an inner tube, and a lever. The torsion spring is situated near the opening of the outer tube, and the inner tube runs through the spring and into the outer tube. In a resting state, the spring fits tightly around the inner tube, holding it in position. When the lever is actuated, the inner diameter of the spring is increased and the inner tube is released for sliding into and out of the outer tube. While the lever is actuated, data display base container 25 can be manually adjusted up or down. Once the desired height is reached, the lever can be released, and the spring tightens around the inner tube, holding the inner tube in position and providing support for data display base container 25.

Also shown in FIG. 6 is a document support 30, which is attached to slide 40. Slide 40 is inserted through an opening in upwardly projecting arm 35 and frictionally engages one or both of the interior surface of said upwardly projecting arm 35 and the upper surface of container 25 to permit controlled adjustment of the position of document support 30. Preferably, document support 30 is hingedly attached to slide 40 to allow document support 30 to take an open position (shown in FIG. 6) for receiving a document or a closed position (not shown).

Container 25 can be mounted to the inner surface of upwardly projecting arm 35 by any conventional means, such as screws, rivets, nuts and bolts, adhesive material, and the like, as would be obvious to one of skill in the art. Container 25, as shown in FIG. 6, further comprises pads, 27 (one at the top of the back surface of container 25 and one at the bottom of container 25), which provide cushioning to the data display device supported therein. Pads 27 provide protection from scuffing, scratching, etc. of the data display device. Pads 27 also substantially prevent slippage of the data display device. Pads 27 are generally made of any conventional non-slip-type material known in the art, preferably, a material also capable of providing cushioning and protection to the data display device. Additionally, pads 27 frictionally interact with the data display device to maintain the data display device in position.

Base 17 is preferentially shaped to impart balance and stability to the overall design of stand 10. Such balance is necessary to avoid tipping of the stand wherein the data display device supported therein is protected from falling out of stand 10 and possibly being damaged. According to the present embodiment, base 17 is wider at the back portion and tapers slightly toward the front portion of base 17. Other conformations of base 17 providing similar balance and support are also envisioned by the present invention. In order to avoid tipping of stand 10, the present invention also envisions embodiments wherein base 17, or an additional component attached thereto, is weighted. When such weighting is used, it is preferred that stand 10 have an overall mass sufficient to prevent accidental movement. Preferably, stand 10 has a mass of up to about 20 pounds, more preferably up to about 10 pounds, and most preferably, between about 5 and 10 pounds. According to the preferred embodiment, the desired levels of balance and stability are achieved through shape and design of the component parts of stand 10.

According to the preferred embodiment of FIG. 6, base 17 is attached to turntable 15, which allows rotary movement of stand 10. The present invention also envisions embodiments wherein base 17 is not attached to a rotary device and either stands alone or is further attached to additional components for imparting balance and stability. When turntable 15 is incorporated into the invention, it is preferred that turntable 15 comprise a non-slip surface on the underneath portion of turntable to provide friction and prevent sliding of stand 10. Such surface could be in the form of rubber pads, suction devices, or any other type of surface known in the art as useful for substantially preventing direct horizontal movement of one flat surface across a second flat surface. When turntable 15 is incorporated into stand 10, it is envisioned that such surface could be used in association with base 17 or another component part used to impart to balance and stability to stand 10.

While avoidance of side-to-side tipping is of importance, the present invention is further designed to avoid frontward or backward tipping. Accordingly, base 17 is preferably of a sufficient depth, measured from front to back, to substantially prevent tipping. To achieve such stability and balance, base 17 is preferably of a length that is greater than or equal to the height of upwardly projecting arm 35. In a most preferred embodiment, base 17 has a length that is roughly equal to the height of upwardly projecting arm 35. Such measurements provide balance and stability that substantially prevents backward tipping of stand 10. Additionally, to avoid frontward tipping, support 45 has a limited extension length such that upwardly projecting arm 35 is substantially prevented from adjusting upward and forward past a position that is essentially perpendicular to the support surface upon which stand 10 is placed. In the preferred embodiment, the upward and forward movement of upwardly projecting arm 35 is limited such that the angle formed between upwardly projecting arm 35 and base 17 is between 45° and 90°, preferentially between 60° and 75°.

Figure 7:
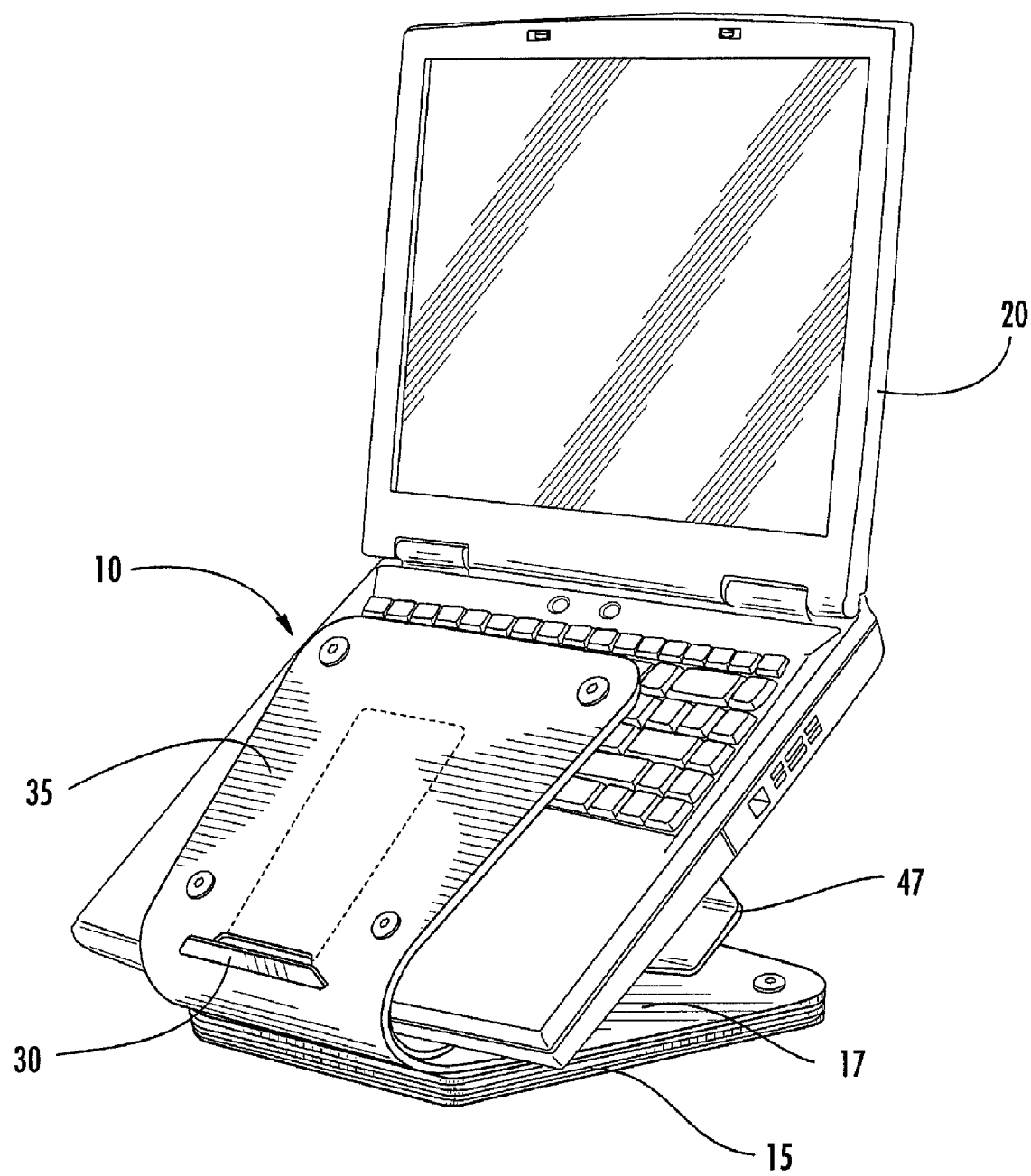
FIG. 7 is a front perspective view of a preferred embodiment of the present invention supporting a laptop computer.

FIG. 7 provides a perspective view of the preferred portable display stand 10 supporting a laptop computer 20. As illustrated in FIG. 7, upwardly projecting arm 35 substantially prevents access to the keyboard and track-pad of laptop computer 20. Accordingly, it is generally envisioned that a peripheral keyboard and mouse (not shown) would be attached to laptop 20 for use in a desktop setting. In alternate embodiments, it is envisioned by the present invention that upwardly projecting arm 35 could take on a multitude of various shapes and conformations allowing limited or more full access to the keyboard and/or track-pad of laptop 20. For example, upwardly projecting arm 35 could take a conformation that is substantially T-shaped or Y-shaped. Further, upwardly projecting arm 35 can be broader or narrower (i.e., I-shaped) than the embodiment shown in FIG. 7. Such conformational flexibility is particularly suited to embodiments wherein the portable display device being supported is a multimedia display device, such as a portable DVD player, wherein upwardly projecting arm 35 may be designed to allow access to the DVD access area for inserting and removing DVDs without removing the device from stand 10. Such examples, of course, are not intended to be limiting in scope and are intended to be exemplary of the various possible conformations. Accordingly, upwardly projecting arm 35 could furthermore take on a shape that is more ornamental in design, thereby making is customizable to various specifications, with the only limitation being that upwardly projecting arm 35 maintain a shape sufficient to impart the desired level of stability to the portable display device being supported.

Figure 8:
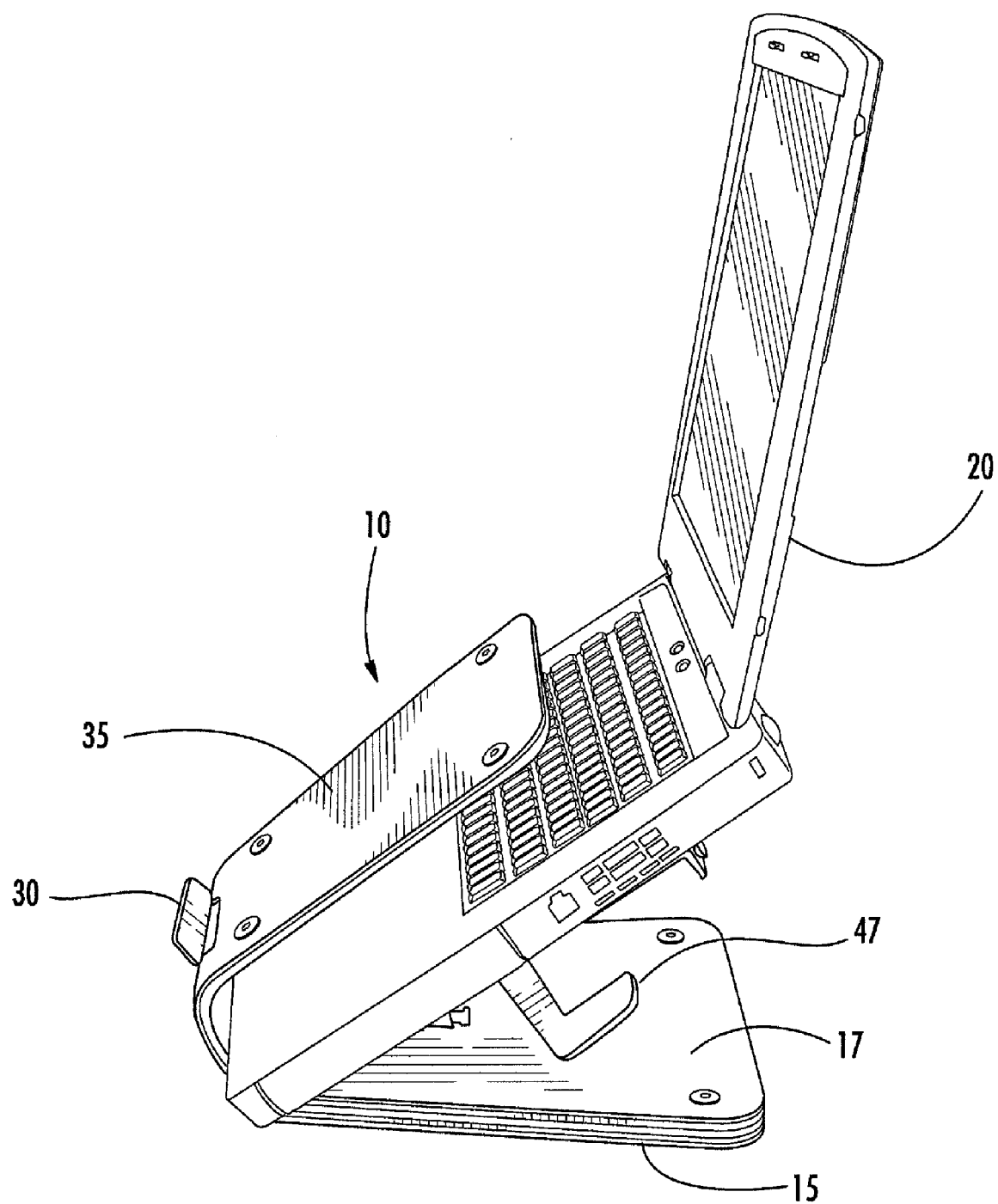
FIG. 8 is a side perspective view of a preferred embodiment of the present invention supporting a laptop computer.

FIG. 8 provides a side view of the stand 10 supporting a laptop computer 20. As seen in FIG. 8, container 25 is substantially rounded at the bottom portion for receiving a data display device, such as laptop computer 20. Container 25 may be modified, however, from the preferred embodiment of FIG. 8 to take on different conformations, such as a more angular shape (i.e. a three-sided square). The only limitation on such shape is that it not substantially hinder upward or downward movement of container 25. Also illustrated in FIG. 8, stand 10 includes base portion 17 rotatably mounted to turntable 15. Upwardly projecting arm 35 projects upward from base 17 and provides support for container 25. Document support 30, in the open position, can also be seen at the front of stand 10.

Figure 9:
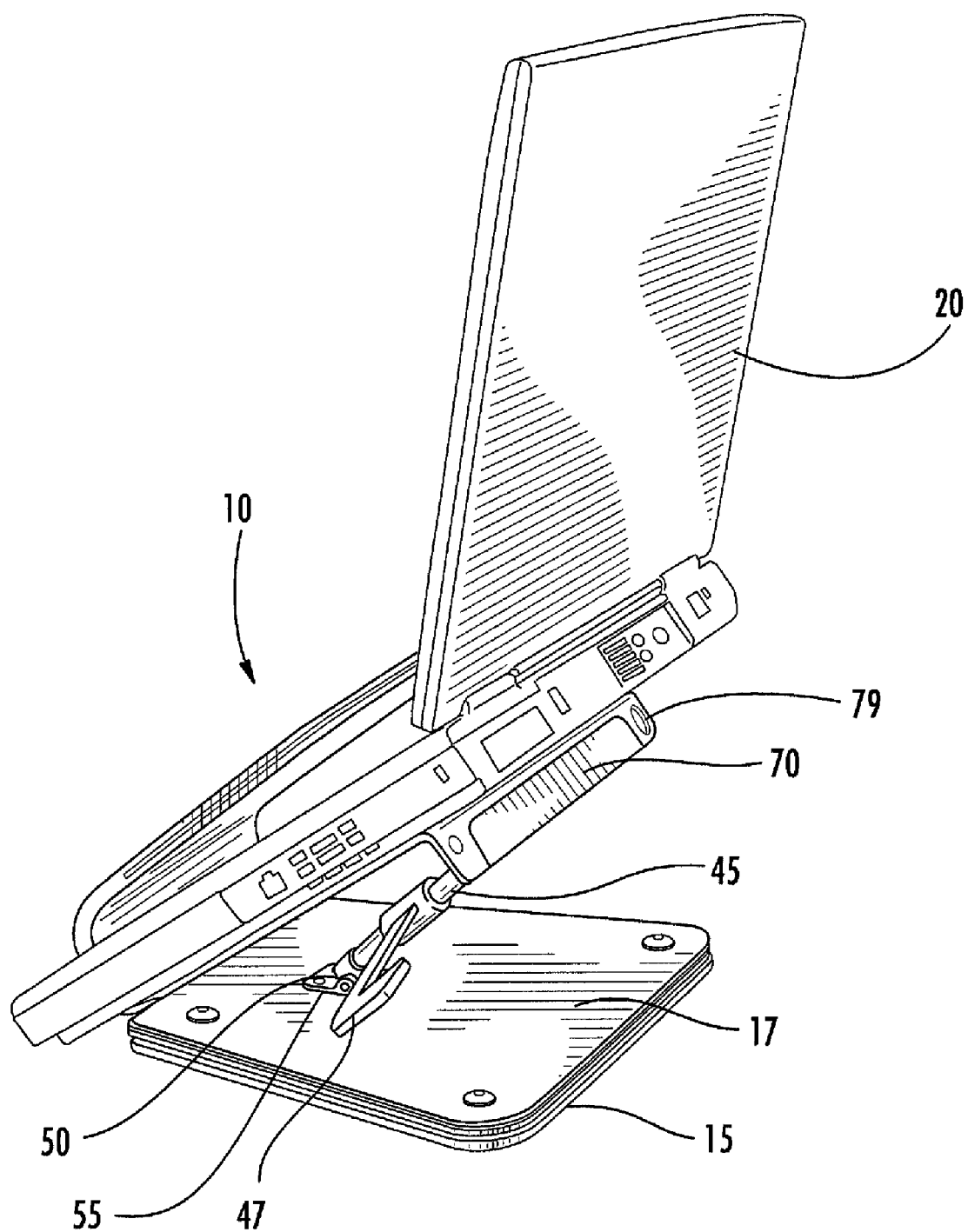
FIG. 9 is a rear perspective view of a preferred embodiment of the present invention supporting a laptop computer.

FIG. 9 provides a rear perspective view of the preferred portable display stand 10 supporting a laptop computer 20. As shown in FIG. 9, container 25 is wide enough for receiving a laptop computer 20 of a size common in the industry. The distance between the front and back portions of container 25, however, can be greater or less than that shown.

FIG. 9 also more fully shows support 45, which is desirably pivotally attached to base 17. In the preferred embodiment of FIG. 9, support 45 is attached with pivot 50 to bracket 55, which is secured to base 17. Support 45 is a brake mechanism that maintains the height of container 25 while engaged. Handle 47 allows for temporary disengagement of the brake to adjust the height of container 25. Preferentially, support 45 has an internal spring (not shown) for returning the handle 47 to the brake-engaged position once manual force by the user is halted. The position of handle 47 to the side of stand 10, and the automatic re-engagement of the braking function of support 45 upon release of handle 47 allow for ease of adjustment by the user. Preferentially, such adjustment can be done with one hand and without removal of the data display device.

FIG. 9 further shows cable rack 70 useful for containing the multiple cables attached to laptop computer 20. As shown in this embodiment, cable rack 70 further comprises lock guide 79, which is useful for guiding mechanism, such as a metal locking cable, to laptop computer 20 for security. To this end, the data display device support of the present invention can further be secured through being bolted to a surface, such as through base 17 or turntable 15.

Figure 10:
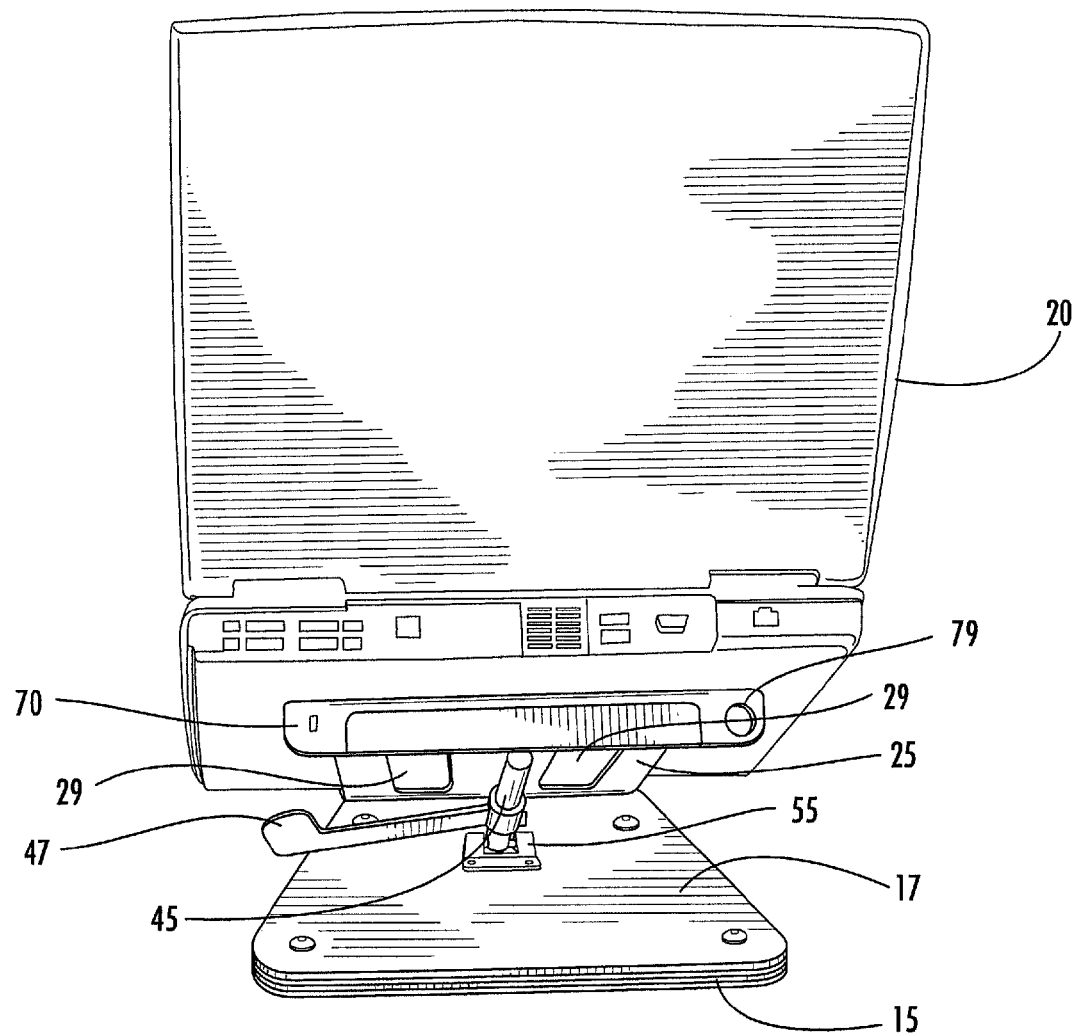
FIG. 10 is a rear view of a preferred embodiment of the present invention supporting a laptop computer.

FIG. 10 provides a rear view of stand 10 supporting laptop computer 20. This figure more fully illustrates the "open" design of the back portion of container 25 allowing for air circulation to laptop computer 20 and heat removal from laptop computer 20. In this preferred embodiment, the back portion of container 25 has two cutouts 29 allowing for air circulation and heat dissipation. Cutouts 29 can vary in shape, size, number, and position.

Also shown in FIG. 10, the back portion of container 25 is of sufficient width to provide adequate stability to data display devices of various sizes. Accordingly, container 25 can be narrower than shown in the preferred embodiment with the only limitation being that it be wide enough to provide side-to-side stability, thereby preventing the data display device from tipping or slipping out of container 25. Further, container 25 can be wider than shown in the preferred embodiment with the only limitation being that it not be so wide as to limit access to handle 47 for adjusting height or to substantially interfere with the aesthetic proportions of stand 10.

Figure 11:
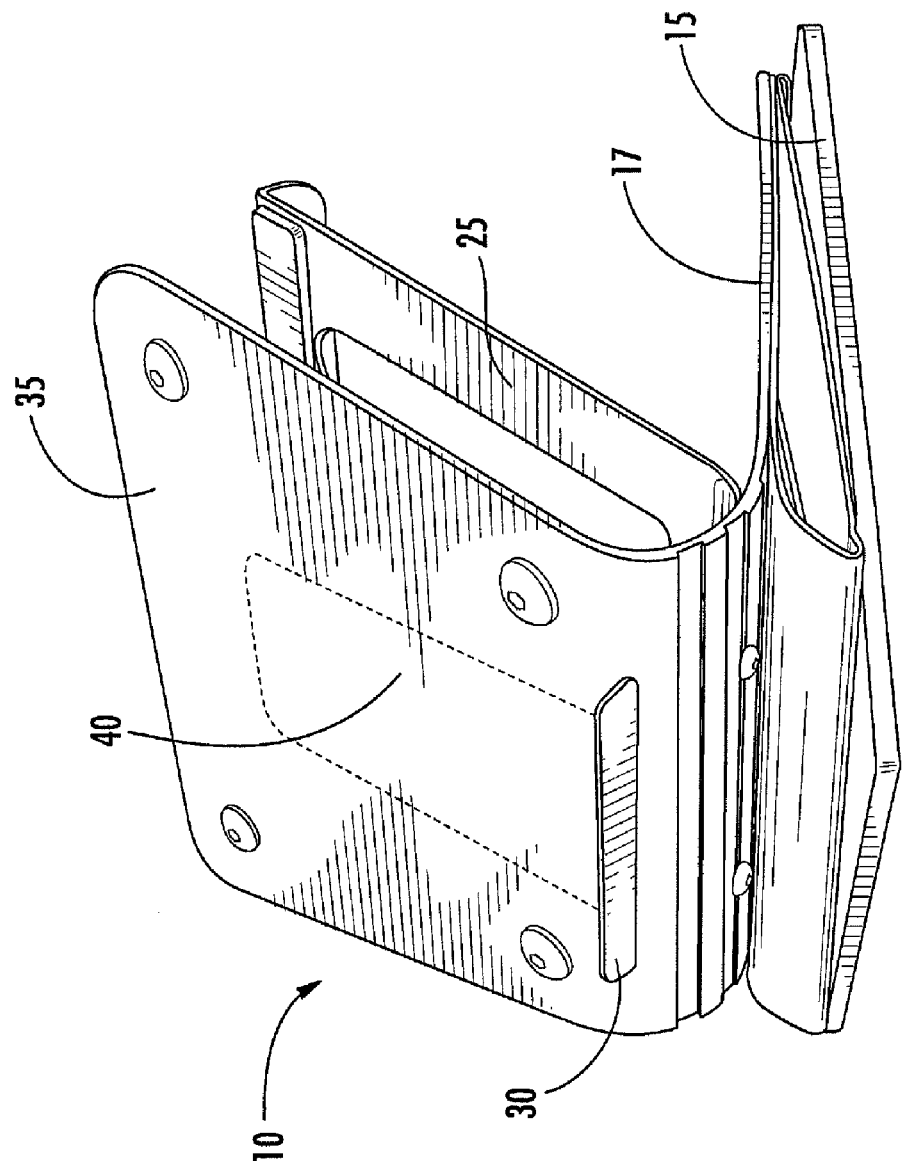
FIG. 11 is a front perspective view of a second preferred embodiment of the present invention.

A front perspective view of second preferred embodiment of the present invention is provided in FIG. 11, which shows stand 10, which includes base 17 rotatably mounted on turntable 15. Attached to base 17 is upwardly projecting arm 35, which provides support for a laptop base container 25.

Figure 12:
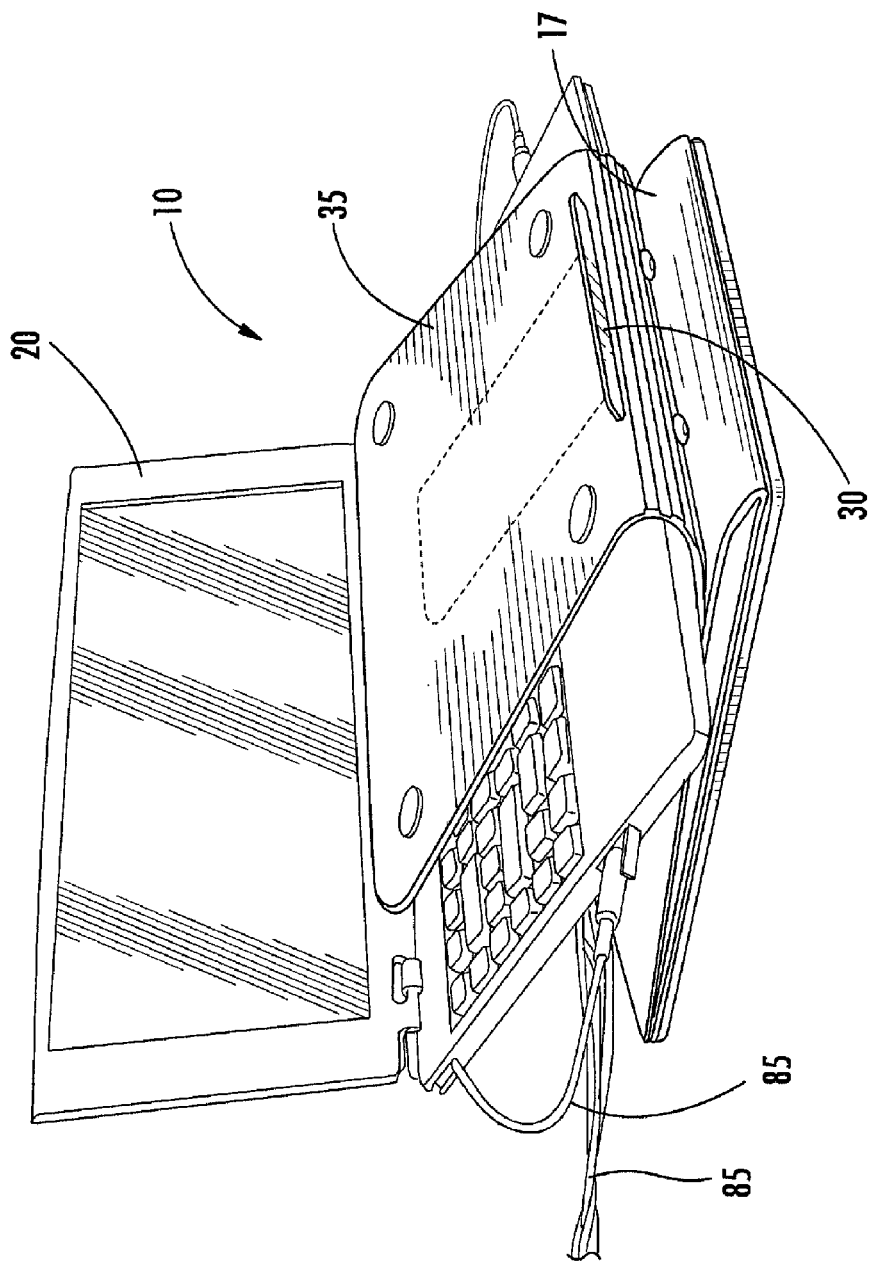
FIG. 12 is a front perspective view of a second preferred embodiment of the present invention.

FIG. 12 is a front perspective view of the second preferred embodiment of the present invention showing laptop 20 resting on stand 10. Also shown in FIG. 7 are cables 85, which are indicative of cables used for attaching peripheral equipment, such as a keyboard or mouse. As the present invention also envisions the use of stand 10 for supporting other data display devices, such as a multi-media device, a keyboard or mouse may not be necessary. In such embodiments, cables 85 may not be present, or, alternately, they may be present for use, such as attachment to secondary sound components, such as speakers.

Figure 13:
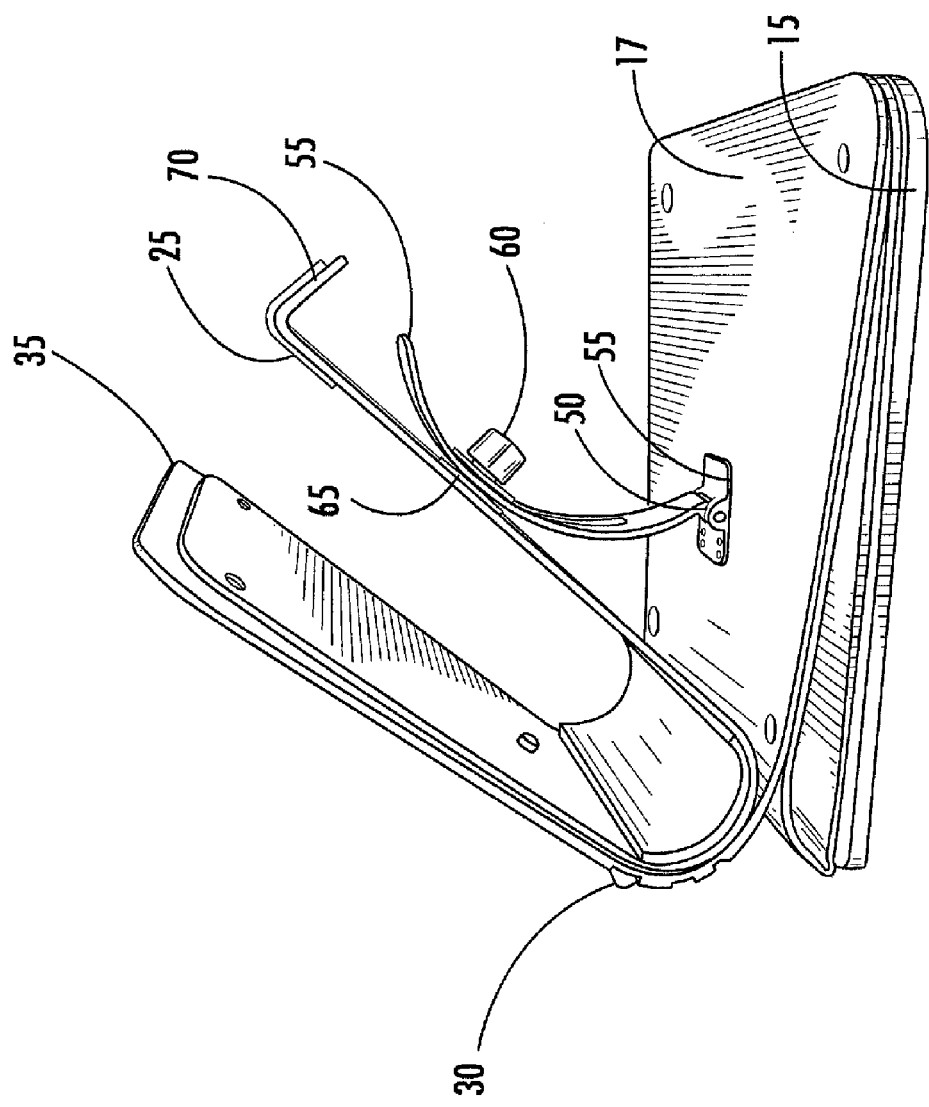
FIG. 13 is a side perspective view of a second preferred embodiment of the present invention with the receiving member in a raised position.

FIG. 13 provides a side view of the second preferred embodiment of FIG. 11. According to the second preferred embodiment of FIG. 11, support 45 desirably has an arcuate shape. It is also desired that support 45 is pivotally attached to base 17. In the embodiment of FIG. 11, bracket 55 secures pivot 50 to base 17, to which support 45 is rotatably attached.

According to the second preferred embodiment, FIG. 13 further illustrates a locking mechanism for fixing the position of container 25 including a hand tightened screw (or nut) 60 and one or more washers 65. When screw 60 is tightened, it puts pressure on the interface between container 25 and support 45 which holds container 25 in place. FIG. 11 also shows a cable rack 70, which is described more fully below.

Figure 14:
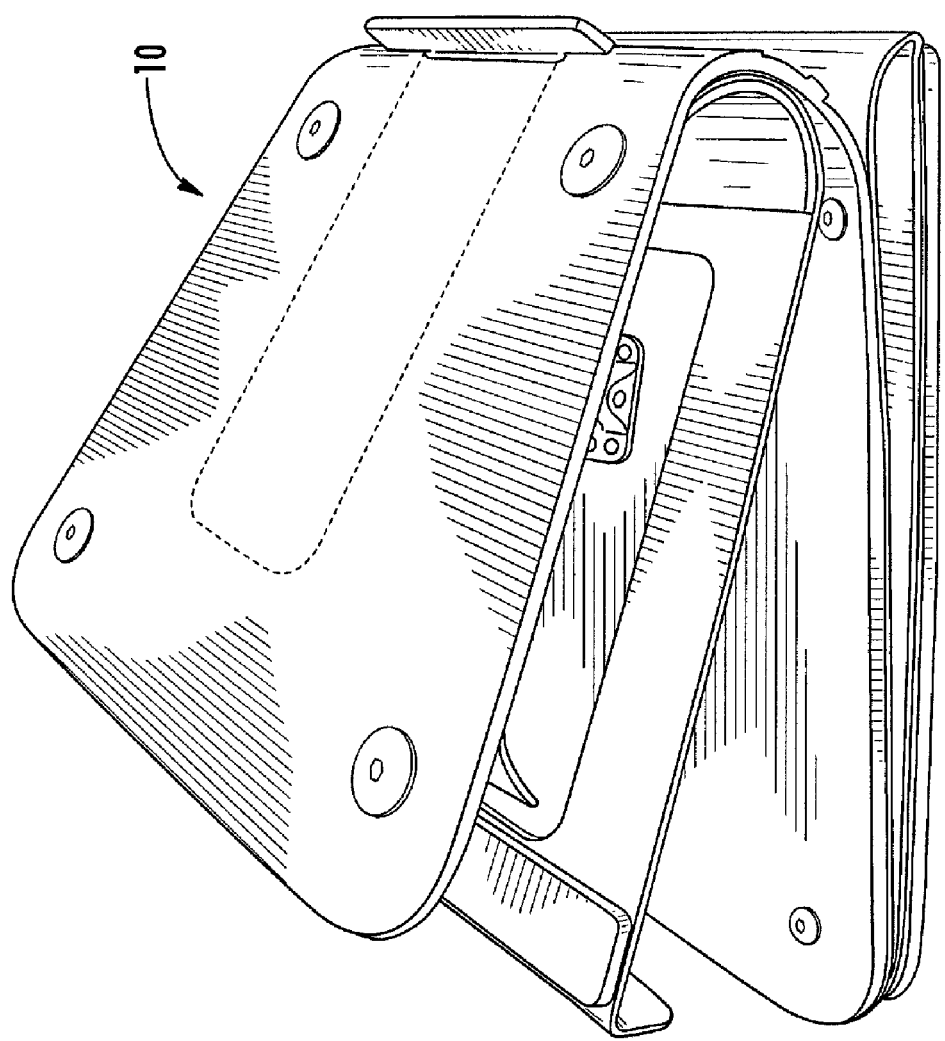
FIG. 14 is a side perspective view of a second preferred embodiment of the present invention with the receiving member in a lowered position.

FIG. 14 shows stand 10 in a lowered position. Desirably, stand 10 has a range of vertical motion in excess of about three (3) inches, preferably stand 10 has a range of vertical motion in excess of about three and a half (3.5) inches, and more preferably stand 10 has a range of vertical motion in excess of about five (5) inches. Typically, the range of vertical motion of stand 10 is less than ten (10) inches.

It is also preferred that stand 10 is able to be restrained in its extreme lower position, its extreme upper position, and substantially any position intermediate between the lower and upper extreme positions. Such restraint is possible through the use of either support mechanism as shown in the preferred embodiments provided herein.

Figure 15:
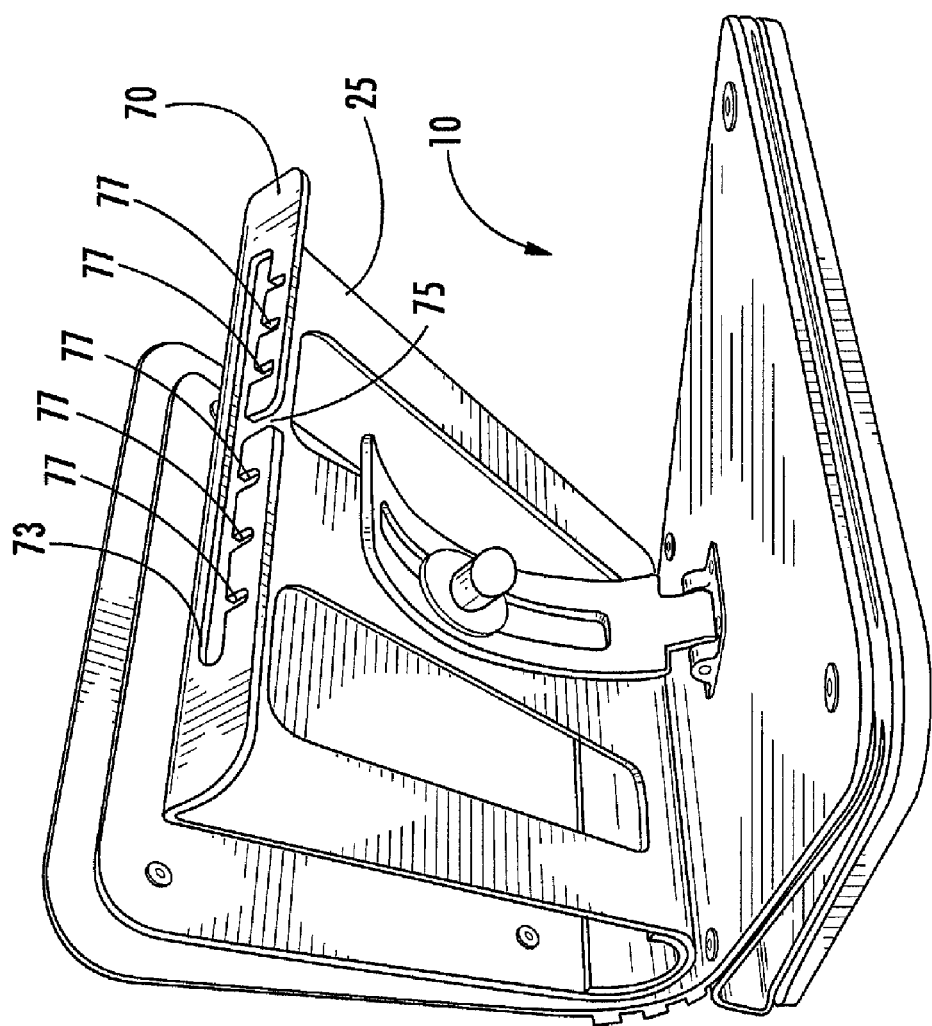
FIG. 15 is a rear perspective view of a second preferred embodiment of the present invention with the receiving member in a raised position.

FIG. 15 shows the second preferred embodiment of stand 10 from the back in a raised position. The raised position shown in FIG. 15, however, is not a fully raised position. FIG. 15 also presents another view of cable rack 70. As seen in this view of this preferred embodiment of the present invention, cable rack 70 has a cable entry slot 75 that communicates with cable raceway 73. The lower edge of cable raceway 73 has a plurality of cable slots 77 that keep the several cables attached to the laptop in a predetermined position and thereby helps free the desktop of loose cables. Any or all of cable entry slot 75, cable raceway 73, and cable slots 77 can be lined with a protective coating, such as a plastic, rubber, or synthetic or natural fabric lining to prevent wear of the insulation covering the cables and help maintain the cables in position.

Figure 16:
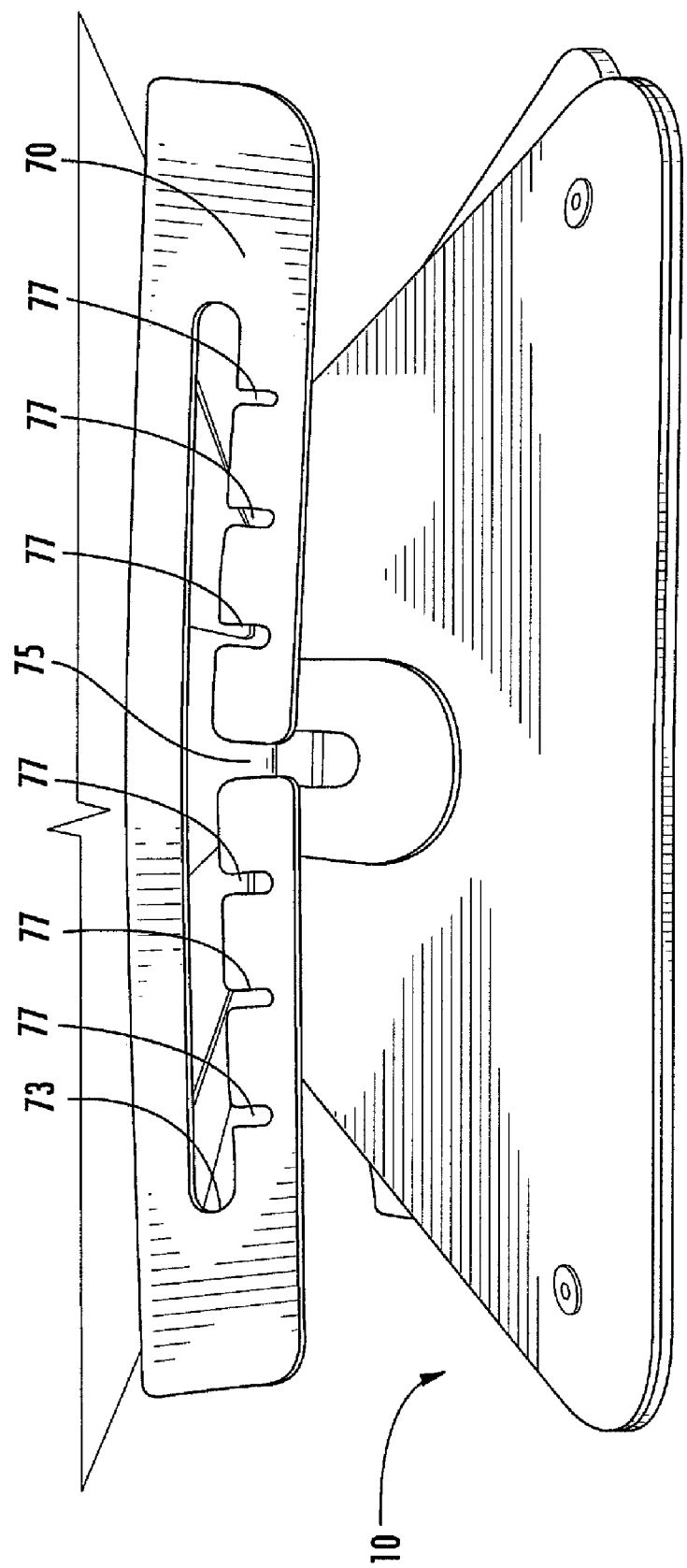
FIG. 16 is a rear perspective view of a second preferred embodiment of the present invention with the receiving member in a lowered position.

FIG. 16 shows stand 10 from the back in a lowered position. This view also provides a view of cable rack 70 with its cable entry slot 75, cable raceway 73 and cable slots 77.

Figure 17:
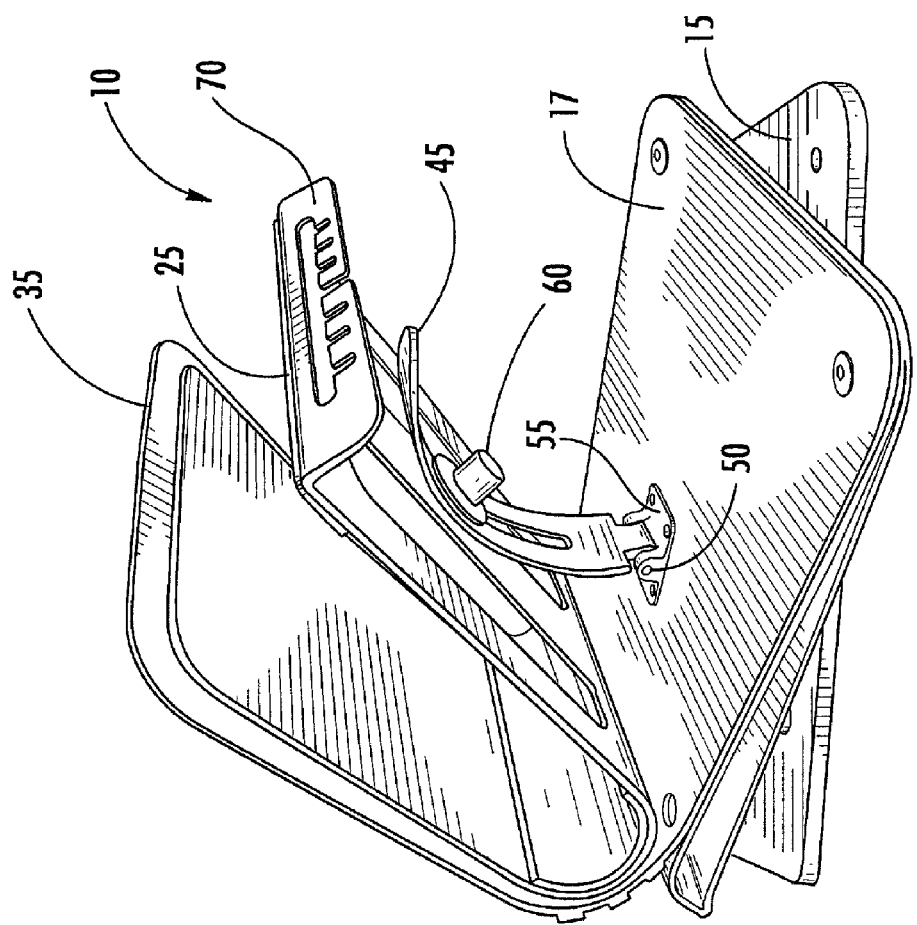
FIG. 17 is a side perspective view of a second preferred embodiment of the present invention in which the base is rotated on a turntable.

FIG. 17 shows base portion 17 rotated about turntable 15.

Figure 18:
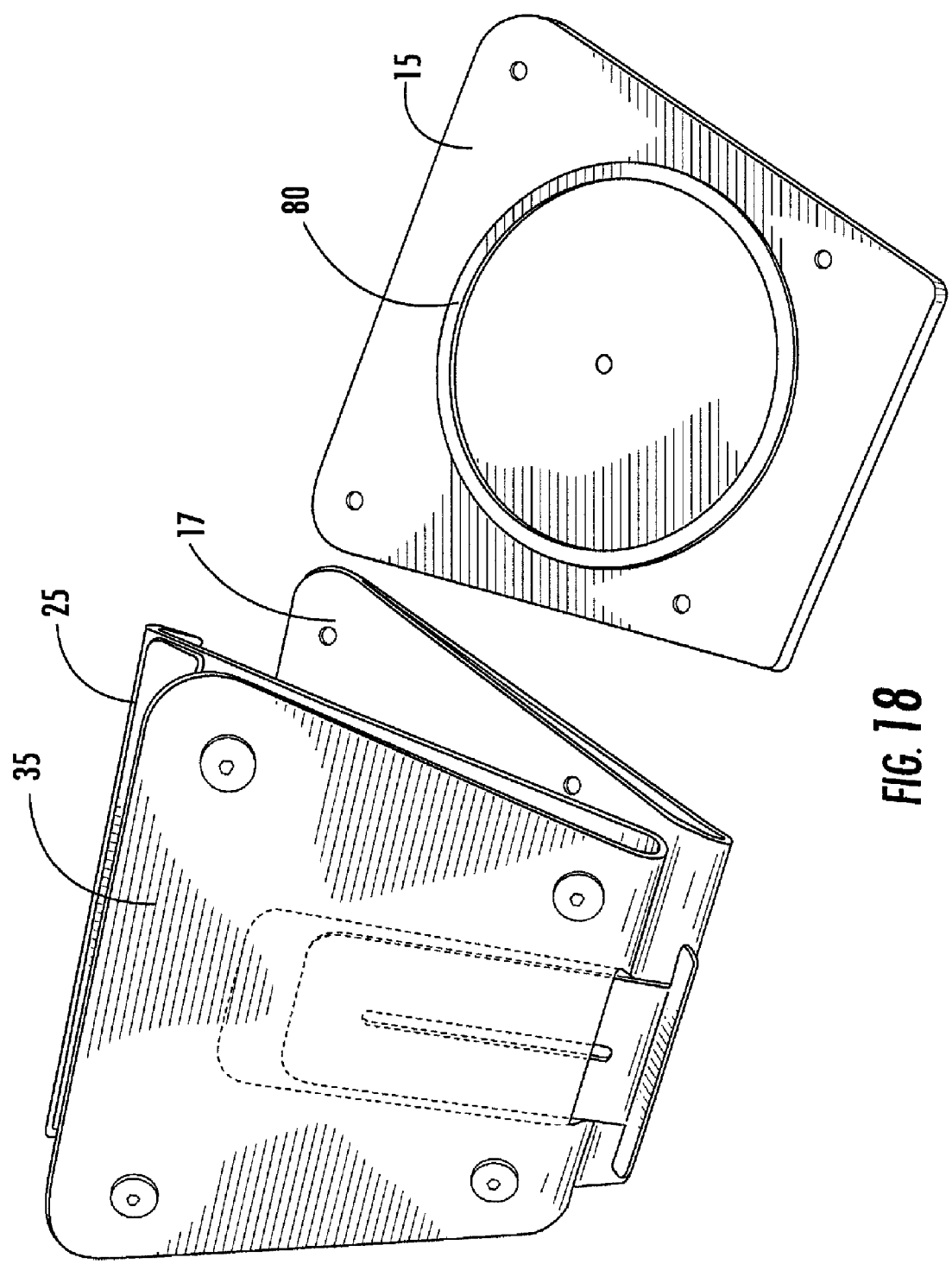
FIG. 18 is a front perspective view of the second embodiment of FIG. 17 in which the turntable has been removed from the base.
Figure 18A:
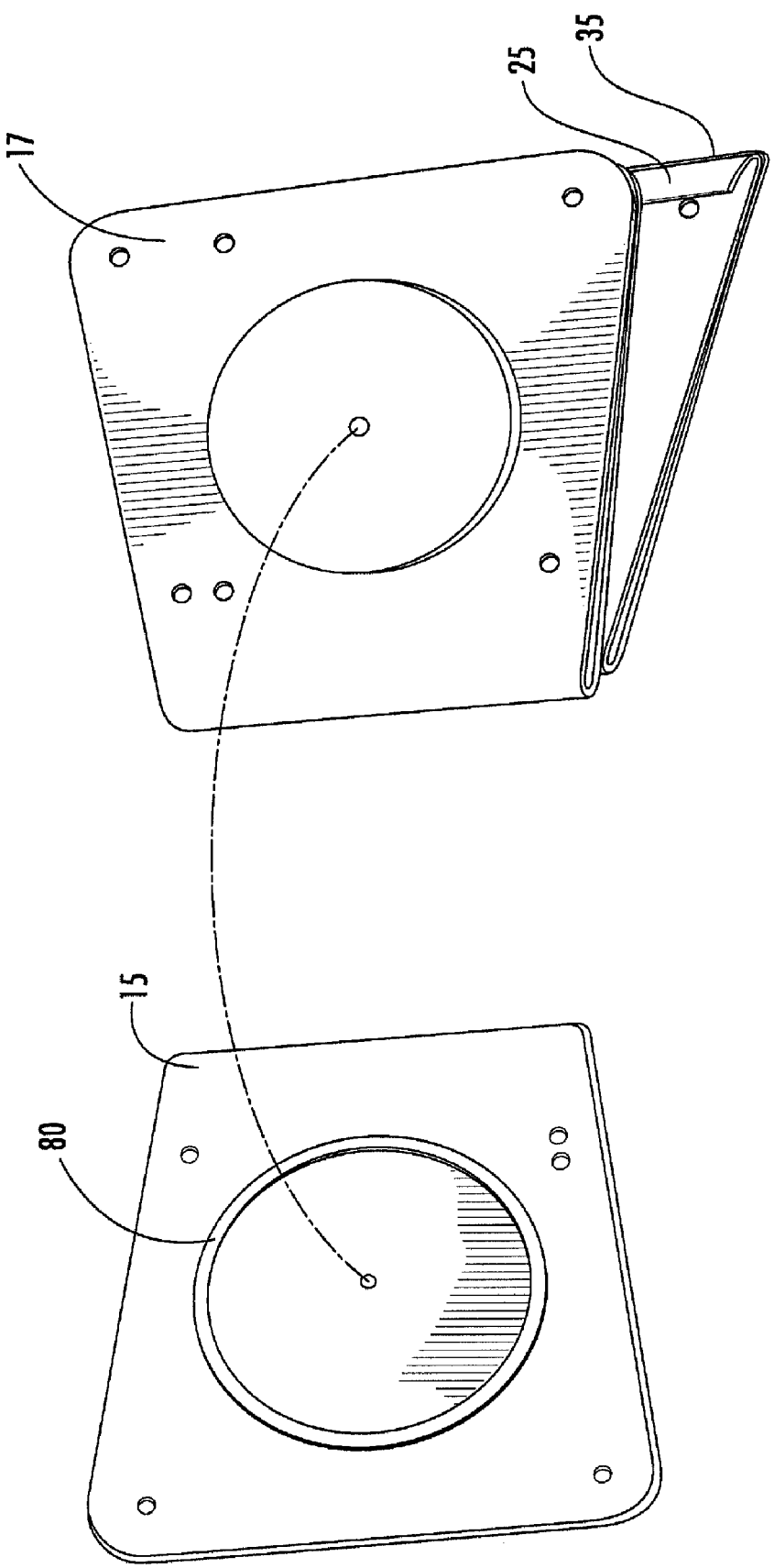
FIG. 18A illustrates the embodiment of the invention shown in FIG. 18 in which the turntable has been removed from the base, but wherein a bottom view of the base is shown and the interrelationship between the turntable and the base is illustrated.

FIG. 18 shows base portion 17 separated from turntable 15. Also visible in this preferred embodiment of the present invention is ring 80. Desirably, ring 80 is made from a low friction material such as polytetrafluoroethylene (sold by the du Pont company under the trademark Teflon'). It is further desired that base portion 17 is rotatably attached to turntable 15 (such as illustrated in FIG. 18A). Typically, base portion 17 is rotatably attached to turntable 15 by a rivet or a nut and bolt.

Figure 19:
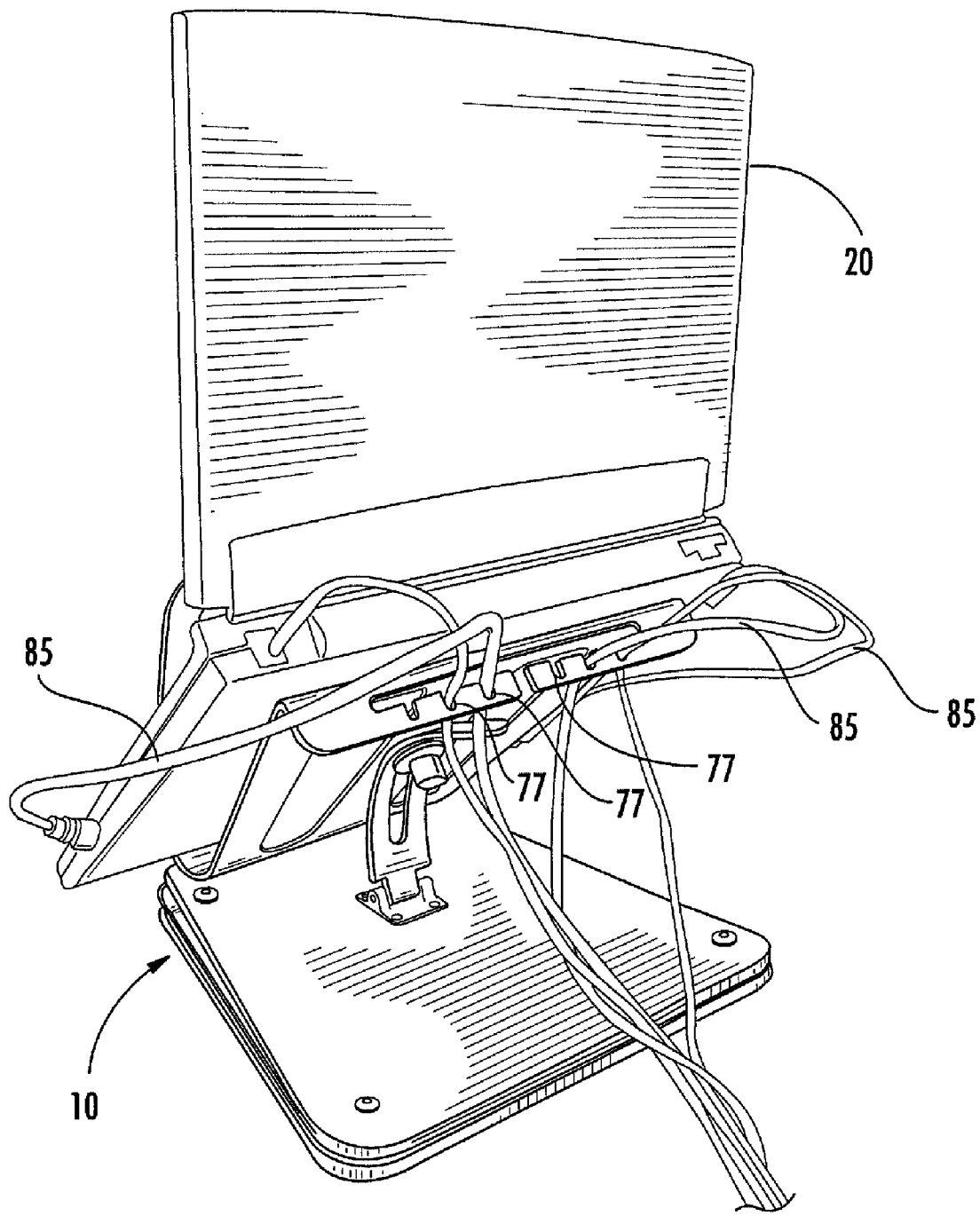
FIG. 19 is a rear perspective view of a second preferred embodiment of the present invention holding a laptop computer and organizing the several cables connected to the laptop computer.

FIG. 19 shows laptop 20 in a second preferred stand 10 according to the present invention. Also seen in this figure are cables 85 in cable slots 77. Thus, loose cables 85 do not obstruct the user's access to the desktop surface not occupied by stand 10.

Figure 20:
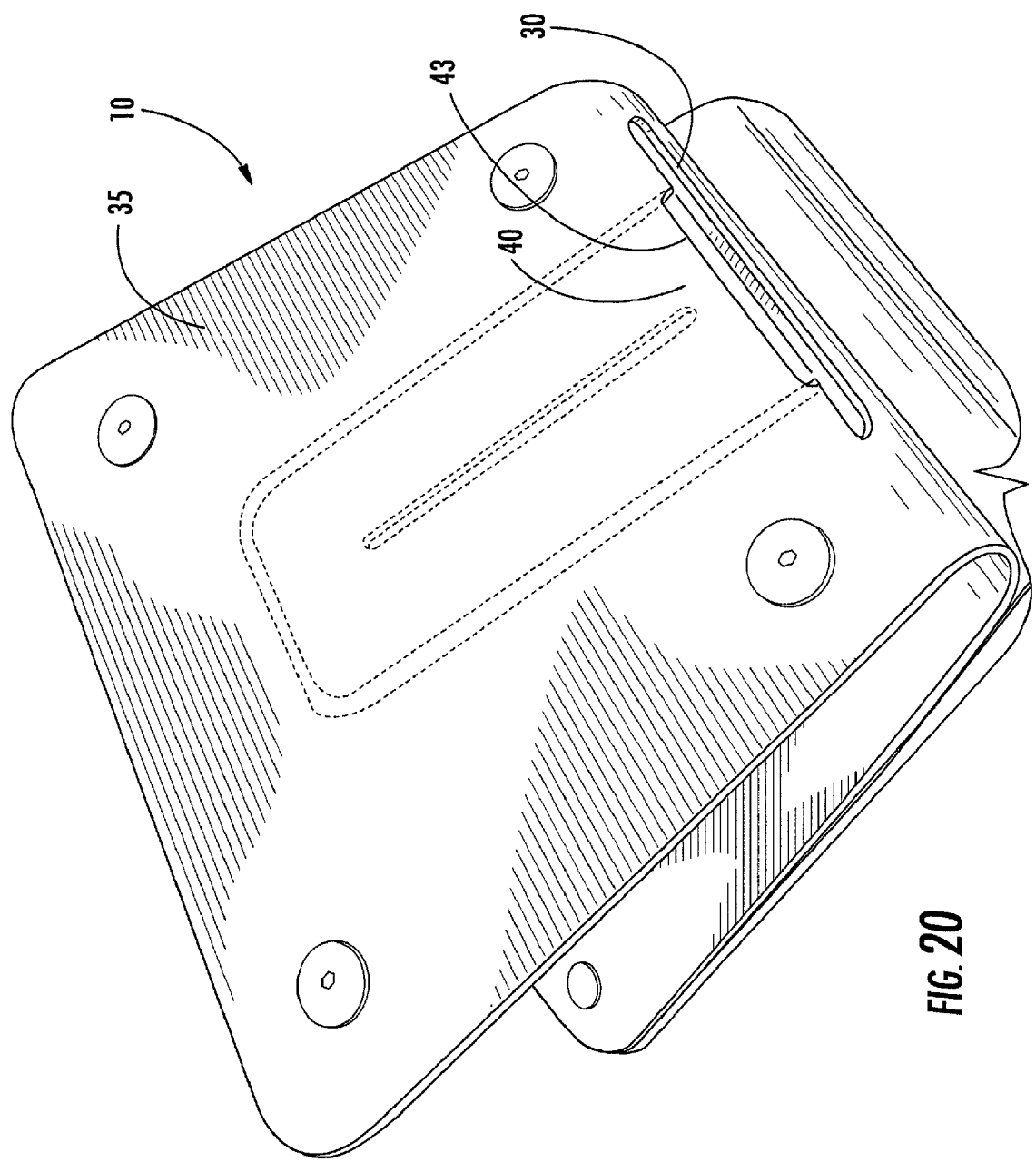
FIG. 20 is a side perspective view of a second preferred embodiment of the present invention having a document support in a retracted position.
Figure 21:
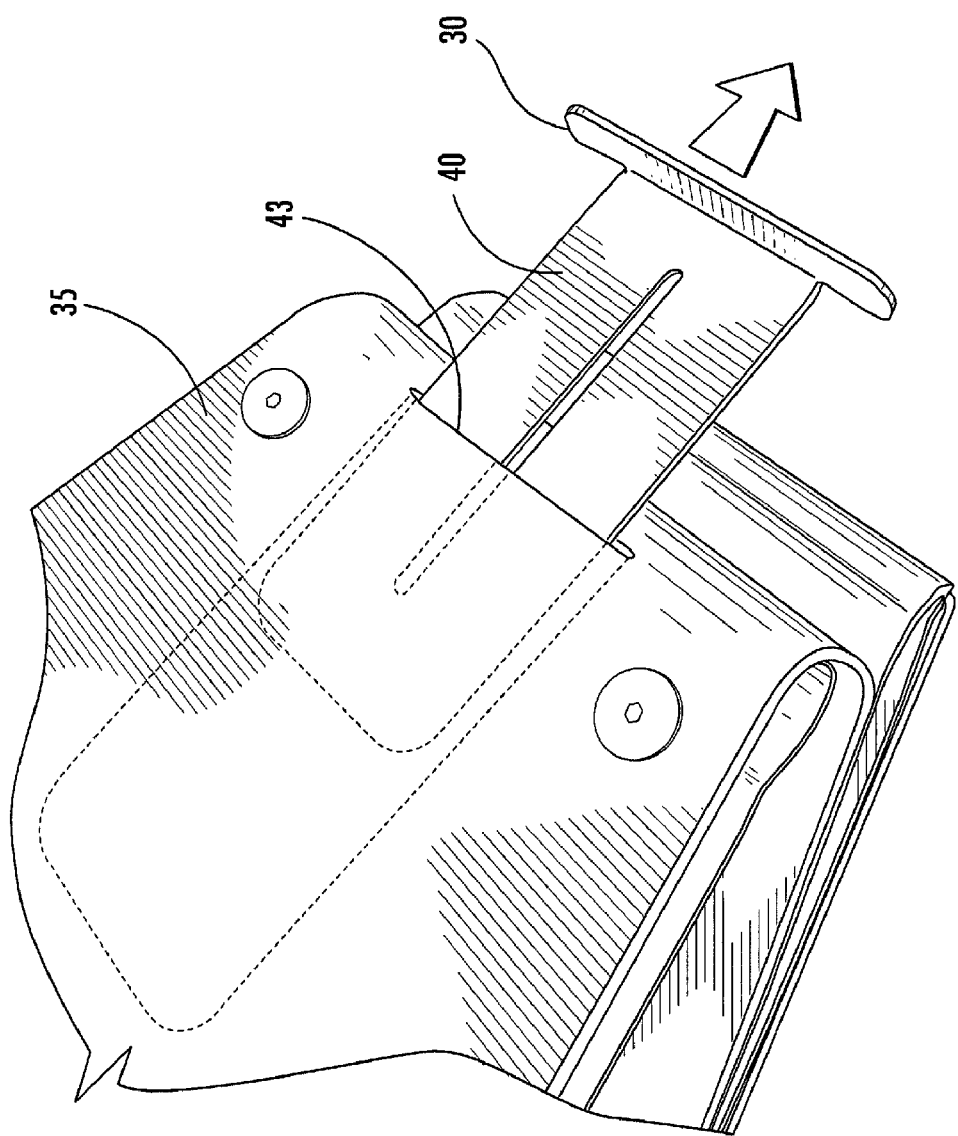
FIG. 21 is a side perspective view of a second preferred embodiment of the present invention having a document support in an extended position.
Figure 22:
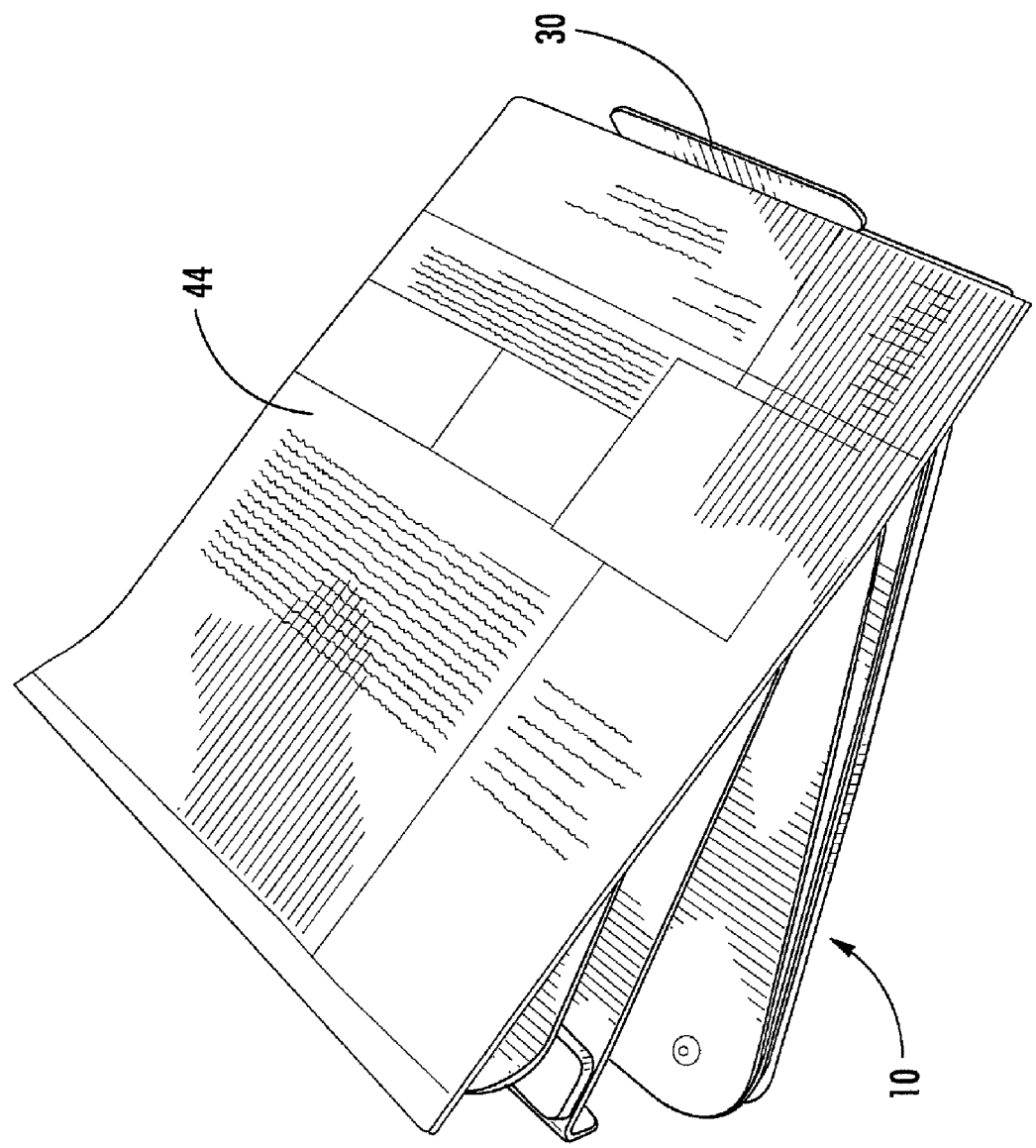
FIG. 22 is a side perspective view of a second preferred embodiment of the present invention having a document on a document support.

FIG. 20 shows a preferred stand 10 with a document support 30 attached to slide 40. Slide 40 is inserted through an opening 43 in upwardly projecting arm 35. In this figure, document support 30 is in a substantially retracted position. FIG. 21 shows the preferred stand 10 of FIG. 20 with document support 30 attached to slide 40, wherein slide 40 in a largely extended position. FIG. 22 again shows the preferred stand 10 of FIG. 20 with document support 30. In this view, document support 30 is holding document 44.

Figure 23:
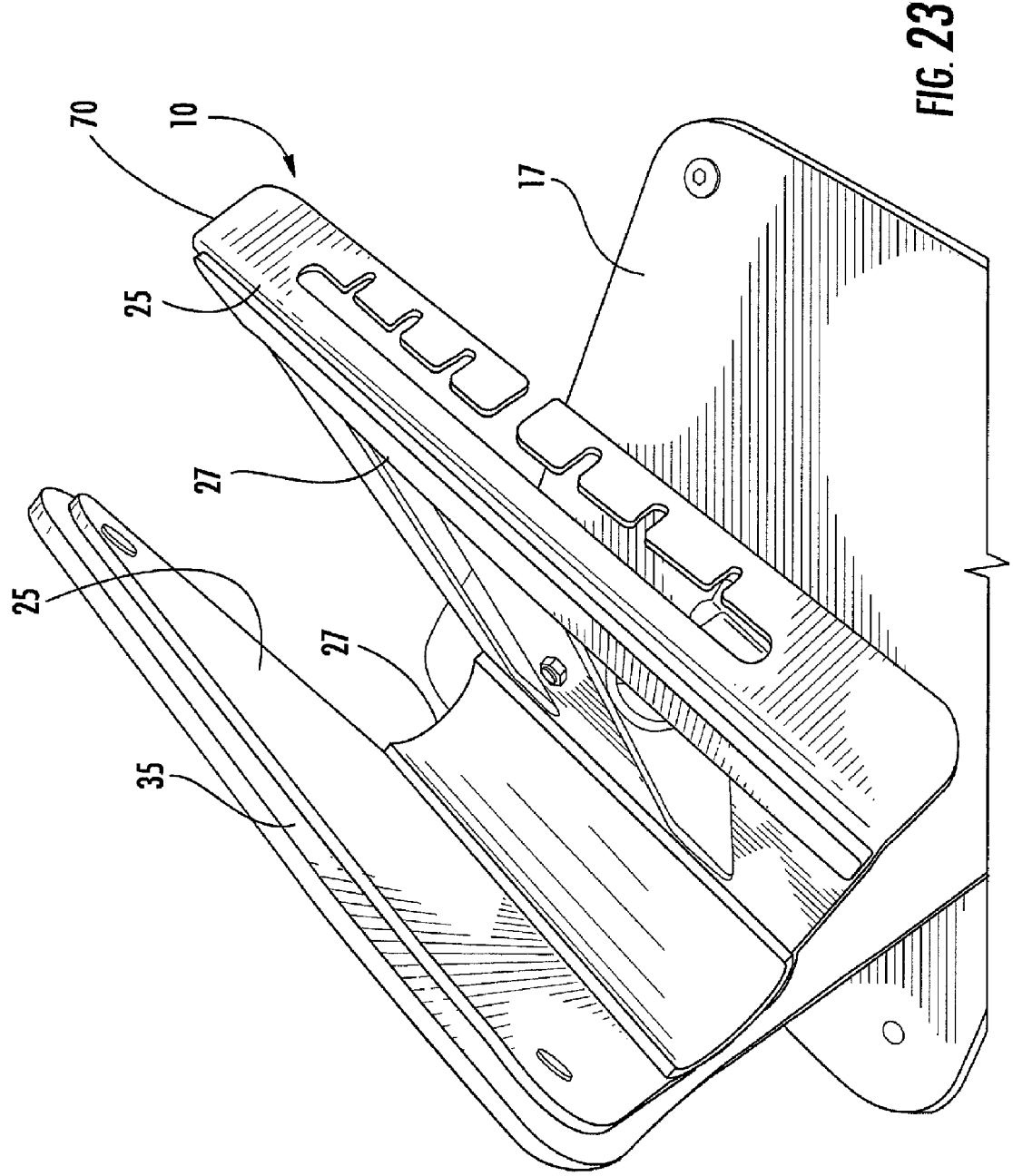
FIG. 23 is a top perspective view of a second preferred embodiment of the present invention.

FIG. 23 shows stand 10 with container 25 in a relatively raised position. This view of this preferred embodiment of stand 10 reveals a more detailed view of cable rack 70, as well as the preferred positioning of pads 27.

Figure 24:
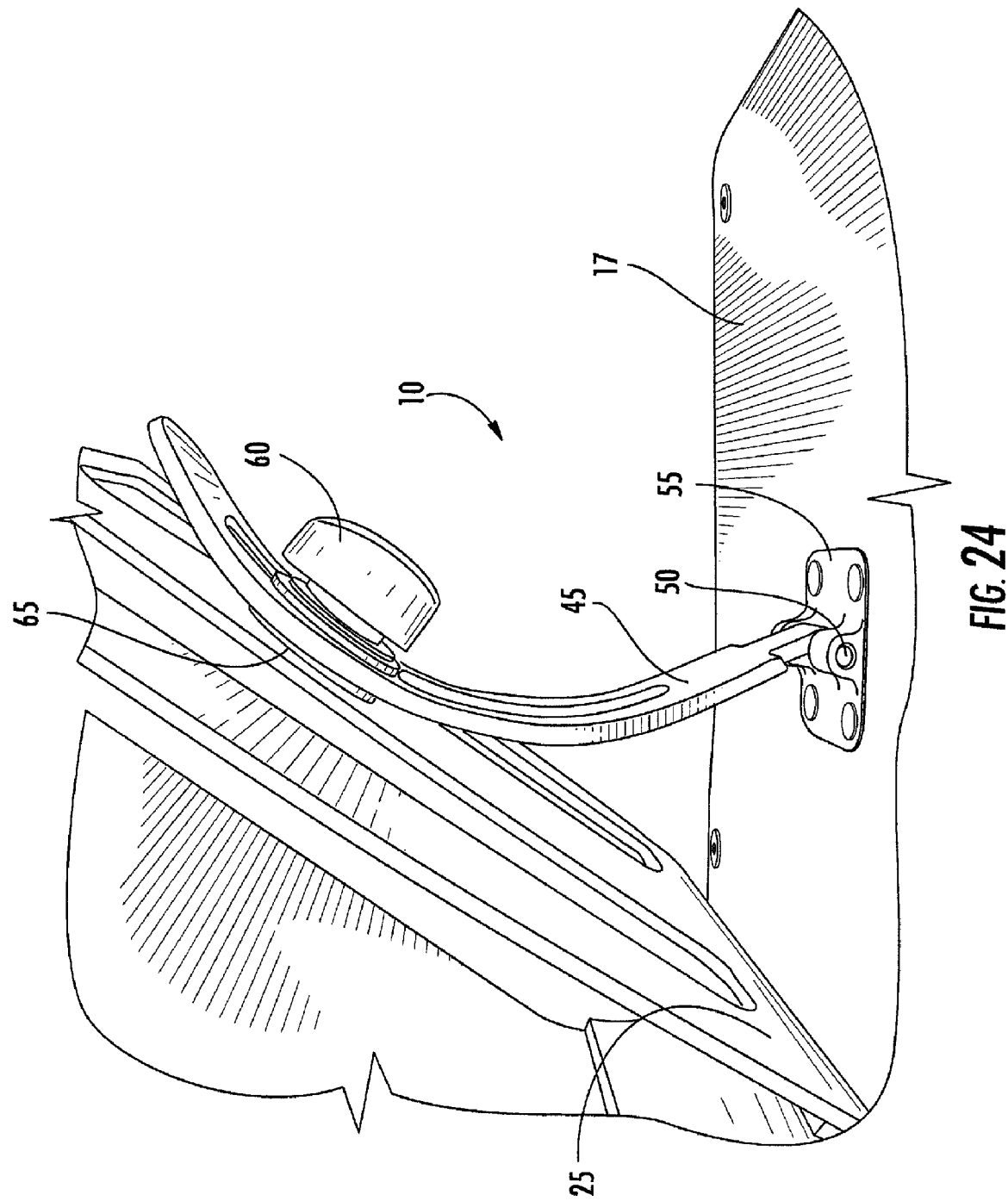
FIG. 24 is a side perspective view of a supporting member useful in a second preferred embodiment of the present invention.
Figure 25:
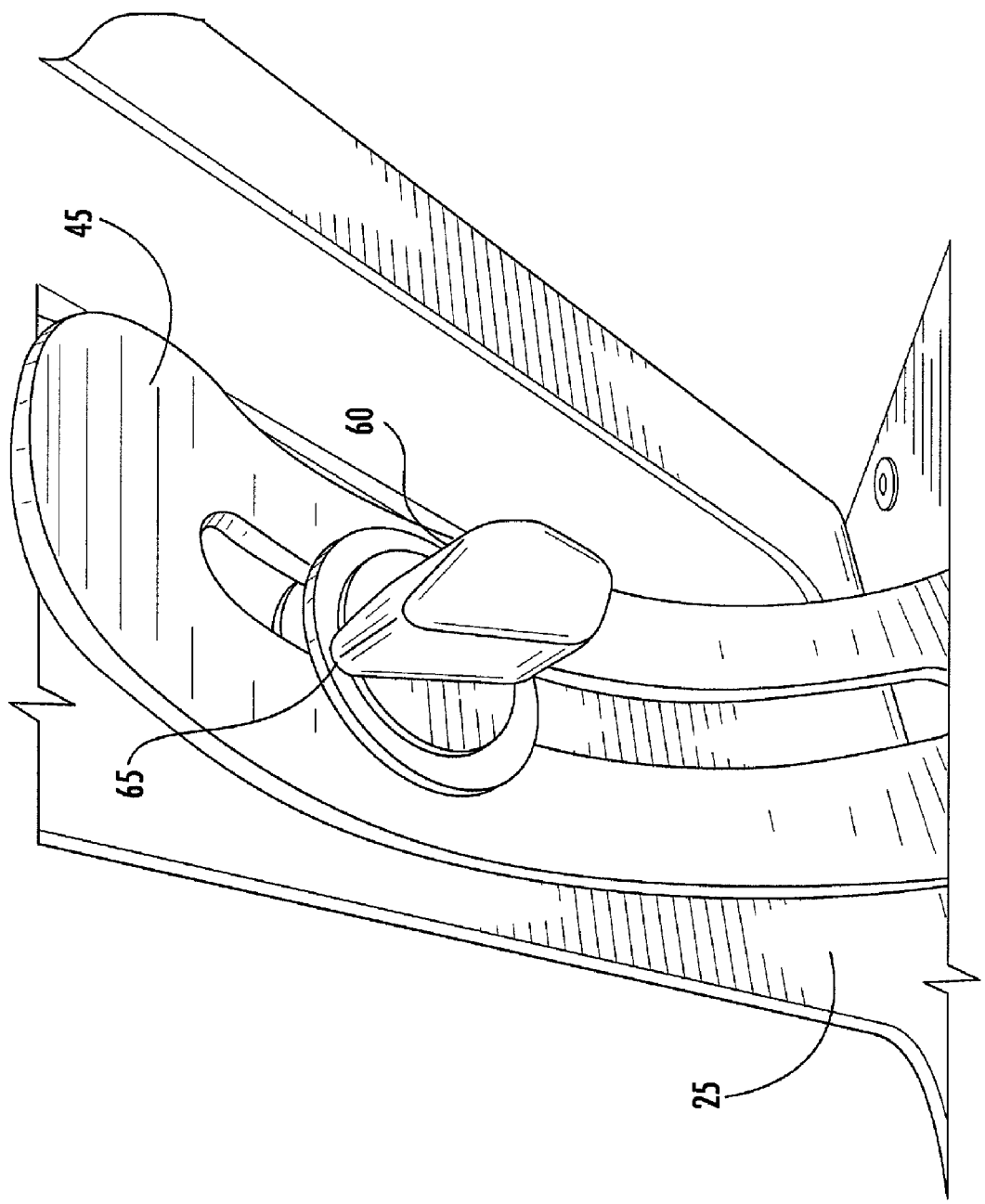
FIG. 25 is a rear perspective view of a locking member mounted on a supporting member useful in a second preferred embodiment of the present invention.
Figure 26:
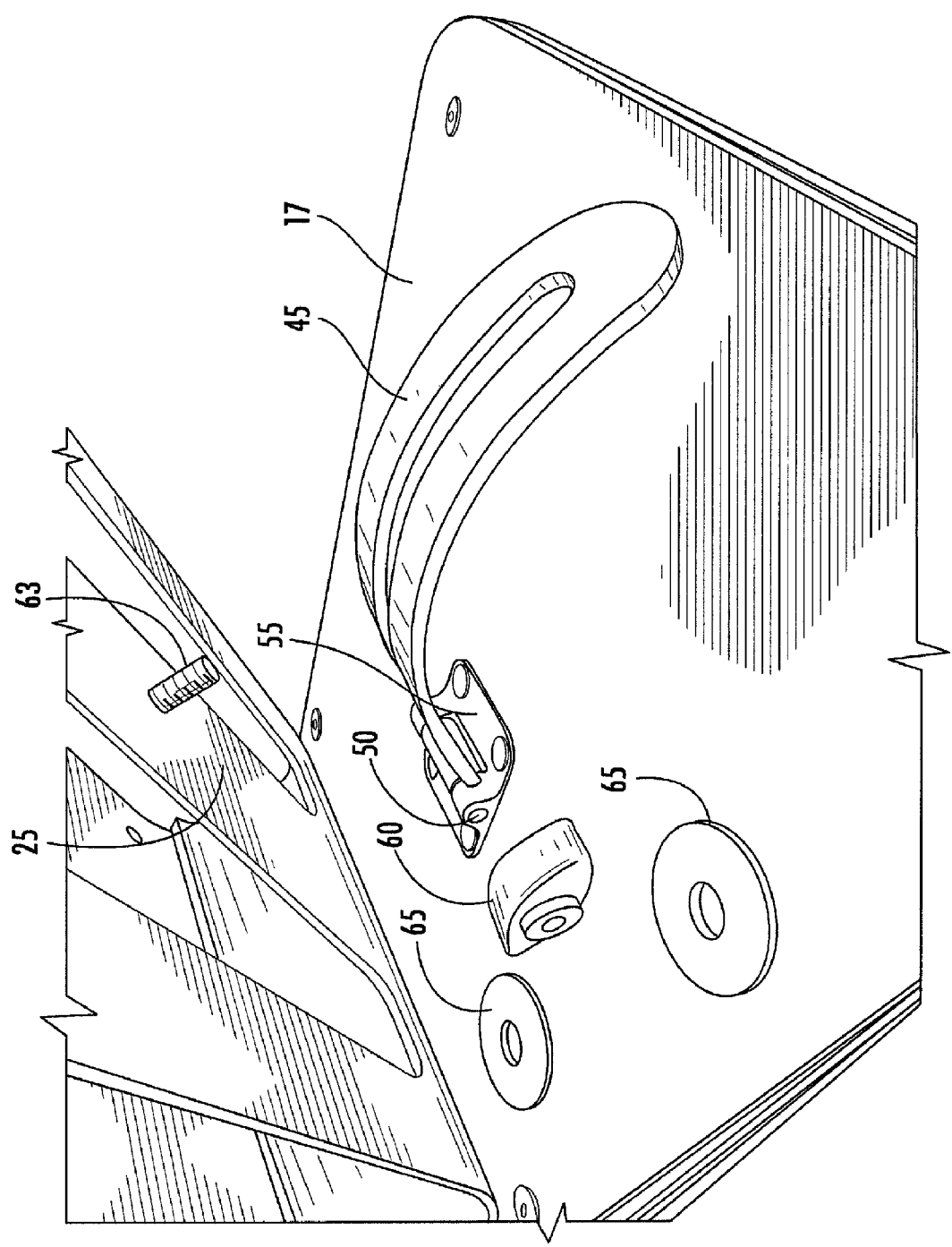
FIG. 26 is a view of a disassembled locking member useful in a second preferred embodiment of the present invention.

FIG. 24 provides an enlarged view of arcuate support 45 pivotally attached to pivot 50 which is secured by bracket 55 to base 17. FIG. 24 also illustrates a preferred locking mechanism according to this embodiment for fixing the position of container 25 including a hand tightened screw (or nut) 60 and one or more washers 65. When screw (or nut) 60 is tightened, it puts pressure on the interface between container 25 and support 45 which holds container 25 in place. FIG. 25 provides a further enlarged view of the connection between container 25 and arcuate support 45 including screw (or nut) 60 and washer 65. FIG. 26 provides an enlarged view of the connection between container 25 and arcuate support 45 unassembled. FIG. 26 also shows screw 63 projecting from container 25, washers 65, nut 60, and pivot 50 (to which arcuate support 45 is attached) secured by bracket 55 to base 17.

Figure 27:
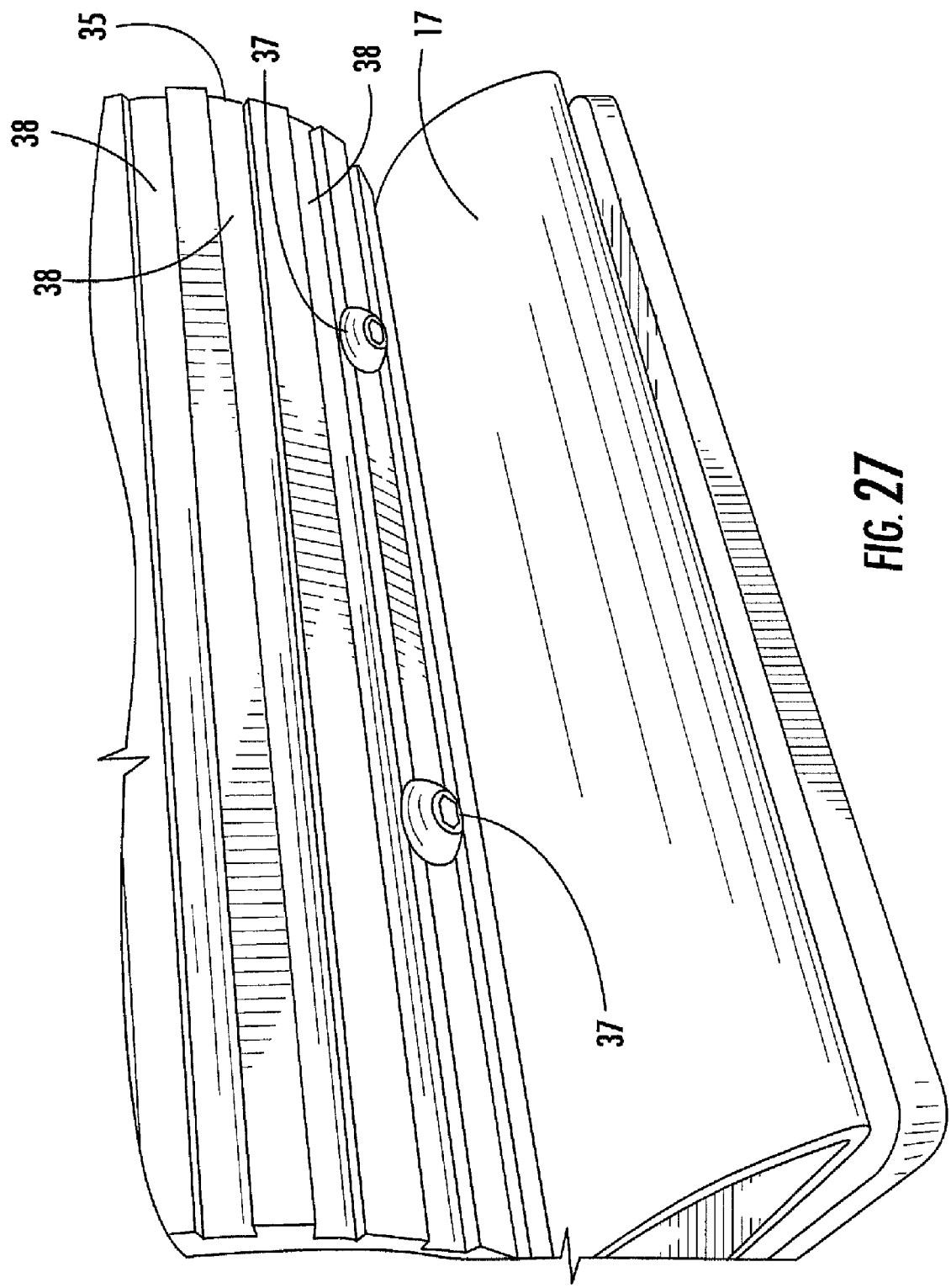
FIG. 27 is an enlarged view of the front of a pivot in a second preferred embodiment of the present invention having a plurality of regions of differing depth.

FIG. 27 shows an enlarged view of the front of a second preferred stand according to the present invention. In this embodiment, upwardly projecting arm 35 has screws 37 which secure container 25 (not seen in this view) to upwardly projecting arm 35.

Also seen in this view is a plurality of groves 38 in upwardly projecting arm 35. These groves 38 are a preferred component of all embodiments of the present invention in that grooves 38 impart flexibility to upwardly projecting arm 35 so as to give the arm a hinge like character. Accordingly, upwardly projecting arm 35 is pivotally attached to base 17. Thus, upwardly projecting arm 35, through is innate structure (i.e. the presence of grooves 38) acts not only as a support for the attachment of container 25, but also as a hinge facilitating the raising and lowering of container 25 with support 45, wherein upwardly projecting arm 35 pivots at the area of grooves 38.

Given the dual characteristic of upwardly projecting arm 35 as a support mechanism and as a hinge mechanism, it is desirable for upwardly projecting arm 35 to be both strong and flexible. Such can be accomplished through the use of an appropriate material for manufacture and through the incorporation of grooves 38. Accordingly, upwardly projecting arm 35 can be made of plastic-type materials, such as polypropylene, or similar materials. Particularly preferred is translucent polypropylene. The number and depth of grooves 38 should be sufficient to allow for flexing of upwardly projecting arm 35 at the area defined by grooves 38. The number of grooves 38 is preferably 2 to 10, more preferably 3 to 8, most preferably 4 to 6.

Figure 28:
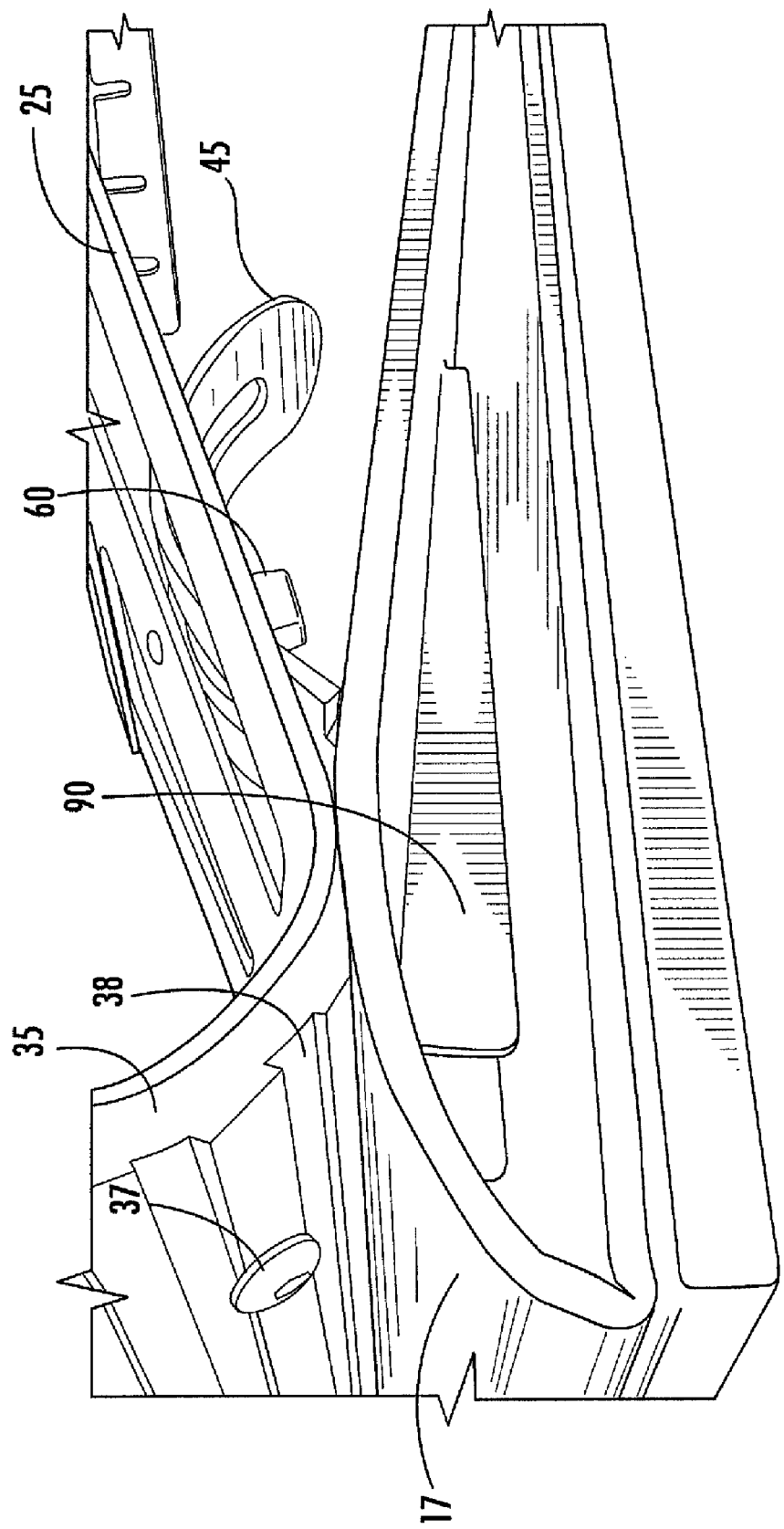
FIG. 28 is an enlarged side view of a pivot in a second preferred embodiment of the present invention having a plurality of regions of differing depth.

FIG. 28 provides an enlarged side view of a second preferred embodiment of the present invention. This view shows base 17, upwardly projecting arm 35, screw 37, groove 38, container 25, support 45 and nut 60. Also shown in this view is wedge 90 that positions the top of base 17 at an angle of about 30 degrees relative to the plane of the work surface upon which the stand is placed.

With the exception of upwardly projecting arm 35, as described above, it is preferred that the remaining components of stand 10 (i.e. turntable 15, base 17, container 25, and cable rack 70) be formed from sheet metal. Other materials having similar strength, durability, and physical properties could also be used. For example, the remaining components could be formed from a hardened plastic.

As discussed above, the particular structure depicted herein is shown for purposes of example only. While the laptop stand is made from solid materials, such as wood, plastic, or metal, it can just as readily be made from tubular materials, rods, grills, etc.

What is claimed is:
1. A data display device stand comprising:
a. a base;
b. a turntable on which said base is rotatably mounted;
c. a pivoting member attached to said base;
d. a data display container secured to said pivoting member;
e. an adjustable support member pivotally attached at a first end to said base and pivotally attached at a second end to said data display container;
f. a document support slidably positioned between said pivoting member and said data display container; and g. a cable rack mounted on the rear outside of said data display.

2. The data display device stand of claim 1, wherein said support member is a slide brake.

3. The data display device stand of claim 1, wherein said support member has a range of vertical movement of at least three inches.

4. The data display device stand of claim 1, wherein said support member has a range of vertical movement of at least three and a half inches.

5. The data display device stand of claim 1, wherein said support member has a range of vertical movement of at least five inches.

6. The data display device stand of claim 1, wherein said cable rack is attached to said data display container.

7. The data display device stand of claim 1, further comprising a lock guide.

8. The data display stand of claim 7, herein said lock guide is positioned on said data display container.

9. The data display device stand of claim 8, wherein said lock guide is positioned on said cable rack.

10. The data display device stand of claim 1, further comprising non-slip pads attached to the underside of said turntable.

11. The data display device stand of claim 1, wherein said pivoting member is comprised of polypropylene.

12. data display device stand comprising:
  a. a base;
  b. a turntable on which said base is rotatably mounted;
  c. a pivot member adapted to hold a portable data display device attached to said base;
  d. a document support slidably attached to said data display stand;
  e. an adjustable support member pivotally attached at one end to said base and pivotally attached at a second end to said data display container, wherein said support member has a range of vertical movement of at least three inches.

13. The data display device stand of claim 12, wherein said support member has a range of vertical movement of at least three and a half inches.

14. The data display device stand of claim 12, wherein said support member has a range of vertical movement of at least five inches.

15. The data display device stand of claim 12, wherein said pivot member is comprised of polypropylene.

16. A laptop computer support stand comprising:
  a. a base having dimensions sufficient to impart stability to said device, wherein said base is rotatably mounted on a turntable;
  b. an upwardly projecting arm hingedly connected to said base;
  c. a data display container secured to said upwardly projecting arm;
  d. an adjustable support member, wherein said adjustable support member is pivotally attached at one end to said base and pivotally attached at a second end to said data display container; and
  e. a document support slidably attached to said support stand.

17. The stand of claim 16, further comprising non-slip pads attached to said data display container.

18. The stand of claim 16, further comprising at least one cutout in said data display container.

* * * * *